(12) United States Patent
Bai et al.

(10) Patent No.: US 11,013,007 B2
(45) Date of Patent: May 18, 2021

(54) EARLY TRANSMIT BEAM SWITCHING

(71) Applicant: QUALCOMM Incorporated, San Diego, CA (US)

(72) Inventors: Tianyang Bai, Bridgewater, NJ (US); Juergen Cezanne, Ocean Township, NJ (US); Navid Abedini, Somerset, NJ (US); Vasanthan Raghavan, West Windsor Township, NJ (US); Jung Ho Ryu, Fort Lee, NJ (US); Bilal Sadiq, Basking Ridge, NJ (US); Kiran Venugopal, Raritan, NJ (US); Jianghong Luo, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 16/379,132

(22) Filed: Apr. 9, 2019

(65) Prior Publication Data

US 2019/0357193 A1   Nov. 21, 2019

Related U.S. Application Data

(60) Provisional application No. 62/673,096, filed on May 17, 2018.

(51) Int. Cl.
*H04W 72/04* (2009.01)
*H04W 72/10* (2009.01)
(Continued)

(52) U.S. Cl.
CPC ......... *H04W 72/046* (2013.01); *H04W 72/02* (2013.01); *H04W 72/10* (2013.01); *H04L 27/2601* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,350,402 | B1 * | 5/2016 | Corbalis | H04B 7/08 |
| 2010/0173626 | A1 * | 7/2010 | Catovic | H04W 36/0083 |
| | | | | 455/423 |

(Continued)

FOREIGN PATENT DOCUMENTS

| | | |
|---|---|---|
| EP | 3382967 A1 | 10/2018 |
| WO | 2016053576 A1 | 4/2016 |

(Continued)

OTHER PUBLICATIONS

International Search Report and Written Opinion—PCT/US2019/026759—ISA/EPO—dated Jun. 14, 2019.

*Primary Examiner* — Xavier S Wong
(74) *Attorney, Agent, or Firm* — Procopio, Cory, Hargreaves & Savitch LLP

(57) ABSTRACT

An apparatus, method, and a computer-readable medium for wireless communication are disclosed. The method including identifying one or more potential times for beam switching within a payload of a symbol. The method also includes determining whether to switch a transmit beam early, a switching configuration, and a switching time based on the one or more potential times for beam switching. The method further includes switching the Tx beam early using the switching configuration and the switching time if deciding to switch the Tx beam early.

35 Claims, 12 Drawing Sheets

(51) Int. Cl.
*H04W 72/02* (2009.01)
*H04L 27/26* (2006.01)

(56) References Cited

U.S. PATENT DOCUMENTS

| | | | | |
|---|---|---|---|---|
| 2013/0343281 | A1* | 12/2013 | Bakker | H04W 16/02 |
| | | | | 370/328 |
| 2014/0293988 | A1* | 10/2014 | Han | H04B 7/0619 |
| | | | | 370/344 |
| 2016/0182136 | A1* | 6/2016 | Zhang | H04L 5/0023 |
| | | | | 370/329 |
| 2019/0150013 | A1* | 5/2019 | Zhang | H04B 7/0695 |
| | | | | 375/224 |
| 2019/0253308 | A1* | 8/2019 | Huang | H04W 72/0466 |
| 2019/0289616 | A1* | 9/2019 | Hampel | H04W 72/10 |
| 2019/0349949 | A1* | 11/2019 | Bai | H04L 5/0094 |

FOREIGN PATENT DOCUMENTS

| | | |
|---|---|---|
| WO | 2017101821 A1 | 6/2017 |
| WO | 2017204929 A1 | 11/2017 |

\* cited by examiner

EARLY TRANSMIT BEAM SWITCHING

CROSS REFERENCE TO RELATED APPLICATION(S)

This application claims the benefit of U.S. Provisional Patent Application Ser. No. 62/673,096, entitled "Early Transmit Beam Switching," and filed on May 17, 2018, which is expressly incorporated by reference herein in its entirety.

BACKGROUND

Technical Field

The present disclosure relates generally to communication systems, and more particularly, to the switching of directional antenna beams.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

Wireless communication systems operating under the 5G/NR, LTE, and other telecommunication standards use directional antenna beamforming to increase system capacity and to increase link budget. Transmitting and receiving devices may switch beams such as beam directions or beam shapes in some scenarios. However, switching beams may introduce delays and/or transient behavior in the communication channels. There is a need for systems and techniques that allow beam switching in communication devices while also reducing the effect of the beam switching on channel capacity and system throughput.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Example techniques disclosed herein include triggering early Tx beam switching before the payload portion of an OFDM symbol ends so as to protect a subsequent symbol from the transient effects of an unsettled beam during a transitioning period.

In an aspect of the disclosure, a method, a computer-readable medium, and an apparatus are provided. An example method includes identifying a potential time for early beam switching within a transmission interval of a symbol. The method also includes determining whether to switch a transmit (Tx) beam early. The method also includes determining a switching configuration and a switching time based on the potential time for the early beam switching. The method further includes switching the Tx beam early using the switching configuration and the switching time in response to determining to switch the Tx beam early.

In an aspect of the disclosure, a method, a computer-readable medium, and an apparatus are provided. An example method includes determining a switching configuration and a switching time of a received early switched beam. The method also includes configuring a receive (Rx) beam to receive the early switched beam. The method further includes capturing, by using a time-shifted window, a symbol of the early switched beam. The payload of the symbol is terminated early by the early switched beam. The method further includes performing an FFT on the symbol captured by the window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
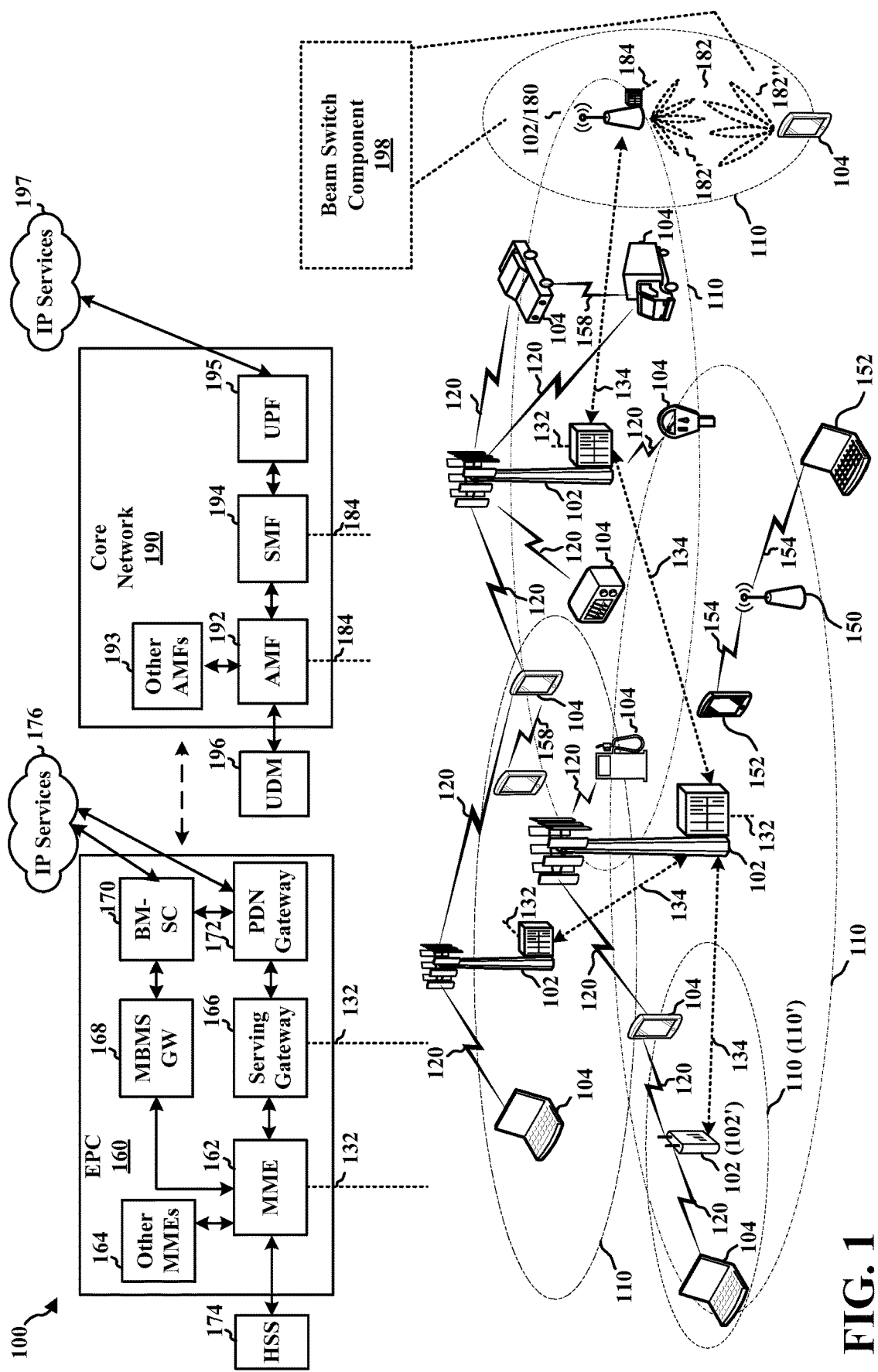
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term "computer-readable medium" is expressly defined to include any type of computer-readable storage device and/or storage disk and to exclude propagating signals and to exclude transmission media. As used herein, the terms "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Because of the extremely high path loss and short range of mmW or near-mmW frequencies, the base station 180 (e.g., a mmW base station) may use directional beamforming to meet the link budget for communicating with the UE 104. The base station 180 may switch the directions or the shapes of the beams when performing beam sweeping or when transmitting different types of signals or payloads. In one aspect, the base station 180 may switch beams when performing a beam sweep with the UE 104 to establish a combination of Tx beams at the base station 180 and Rx beams at the UE 104 that meet the link budget, or to refine the Tx beam to better align with the Rx beam to improve the communication link. For example, the base station 180 may transmit beamformed reference signals to the UE 104 when sweeping through the beams and may receive feedback information from the UE 104 on the strength of the reference signals received at the UE 104. The reference signals may be NR-synchronization signals (NR-SS) to determine subframe/symbol timing, channel state information reference signals (CSI-RS) for channel estimation, beam measurement RS (BRS), beam refinement RS (BRRS), sounding reference signals (SRS) for channel quality estimation, etc. In one aspect, the base station 180 may switch beams when transmitting control and data channels over different beams. For example, the base station 180 may transmit the PDCCH over a first beam and may transmit the physical downlink shared channel (PDSCH) that carries user data, broadcast system information over a second beam. In one aspect, the base station 180 may switch beams when transitioning between data and reference signals. For example, the base station 180 may transmit the PDSCH using a lower MCS on a wider beam and may transition to transmitting the CSI-RS using a higher MCS on a narrower beam to increase the antenna gain due to the increased susceptibility of the MCS signal of EVM loss.

Figure 4:
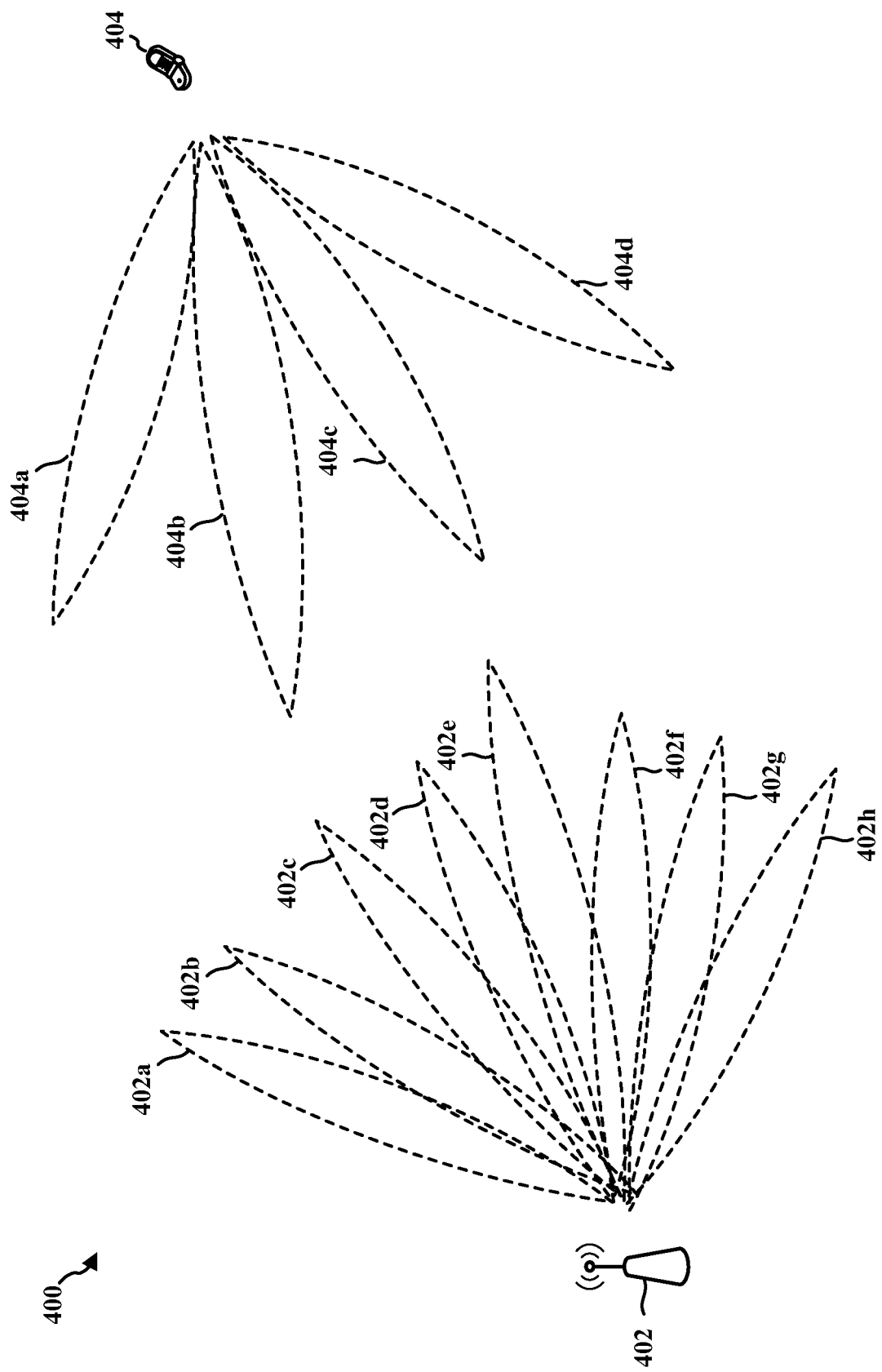
FIG. 4 is a diagram illustrating a base station in communication with a UE using beamforming.

FIG. 4 is a diagram 400 illustrating antenna beam patterns from various beams of a base station 402 and a UE 404 in communication with each other. The base station 402 and/or the UE 404 may have one or more antenna arrays. The antenna arrays may be configured to provide directional beams in a plurality of directions. For example, multiple phased antennas arrays may be used to provide high gain antenna pattern in a direction corresponding to each beam. The base station 402 may transmit a beamformed signal to the UE 404 in one or more of the beams 402a, 402b, 402c, 402d, 402e, 402f, 402g, 402h. The UE 404 may receive the beamformed signal from the base station 402 in one or more receive beams 404a, 404b, 404c, 404d. The UE 404 may also transmit a beamformed signal to the base station 402 in one or more of the beams 404a-404d. The base station 402 may receive the beamformed signal from the UE 404 in one or more of the receive beams 402a-402h. The shapes of the beams 402a-402h, 404a-404d may vary in accordance with a desired antenna gain for each beam to meet a link budget. The base station 402/UE 404 may perform beamforming sweep and measurements to determine the receive and transmit beams to use for each of the base station 402/UE 404 for different types of signals or payloads. The transmit and receive beams for the base station 402 may or may not be the same. Similarly, the transmit and receive beams for the UE 404 may or may not be the same.

The base station 402/UE 404 may change the beam directions and beam shapes of the 402a-402h, 404a-404d by changing the phases of the multiple phased antennas arrays. A transmission path for a signal may include a baseband digital processor configured to modulate data to be transmitted on the subcarriers of an OFDM symbol. The transmission path may include an RF transceiver configured to up-convert, filter, and/or amplify the baseband signal to an RF carrier such as the mmW frequency. The baseband digital processor and the RF transceiver may be configured to change the phases of the multiple phased antennas arrays to transmit the RF signal over the beamformed link. Because of the hardware latencies associated with changing, applying, and/or combining the phases of the multiple phased antennas arrays, there may be a latency from the time the base station 402/UE 404 initiates or triggers a beam switch to when the beam settles to the expected value. In one aspect, the latency may include the channel delays, delays through the Rx or Tx filters at the receiver and transmitter, etc. This latency, called the beam switching time, may be a few hundreds of ns in length. During this beam switching time, the beam is in a transient state and data carried by the RF signal over the beam may not be reliability demodulated and decoded.

An OFDM symbol is a cyclic structure that includes a CP followed by a payload carrying the modulated data on the subcarriers. The CP is a cyclic shift of an end portion of the payload and acts as a buffer to guard against ISI from a prior symbol. A receiver receiving the OFDM symbol performs an FFT on the signal samples of the payload to extract the modulated data. Because of the cyclic structure of the OFDM symbol, multipath or channel delays that cause a shift of the signal samples of the CP into the payload do not destroy the orthogonality of the subcarriers modulated with the data, as long as the CP is longer than the channel delays. To mitigate the effect of the unsettled beam over the beam switching time, the base station 402/UE 404 may switch beams at the start of the CP of an OFDM symbol. Similar to using the CP to guard against ISI, a receiver performing an FFT on the signal samples of the received payload may demodulate the data on the OFDM subcarriers if the CP is longer than the beam switching time.

Referring again to FIG. 1, in certain aspects the base station 102/180 and/or the UE 104 may comprise a beam switch component 198 configured to initiate beam switching before the end of the full payload portion of an OFDM symbol to reduce the probability of the beam switching time becoming so long that it leaks into the payload of the OFDM and destroys the orthogonality of the subcarriers. For example, the base station 102/180 and/or the UE 104 may terminate the payload portion of the OFDM symbol early and may trigger an early beam switch to protect a subsequent symbol from the unduly long transient effects of an unsettled beam. In one aspect, the subsequent symbol to protect may be a "high priority symbol," such as symbols containing DM-RS signals used for channel demodulation and demodulation by a receiver, or CSI-RS used by a receiver to estimate channels for generating the receiver CQI, PMI, or RI measurements. In one aspect, the subsequent symbol may be a data symbol that has high MCS, high coding rate, and/or relatively more stringent reliability requirements. In one aspect, the symbol whose payload is terminated early by the Tx beam switching may be the PDCCH that may have lower MCS, lower coding rate, and/or other symbols that may be relatively more tolerant of EVM loss or decoding errors, and are treated as lower priority symbols.

Although the following description is directed to a base station performing certain of the operations and a UE performing other operations, it should be appreciated that the operations may be performed by either the base station or the UE. Furthermore, while the following description describes the concept using the example of OFDM symbols, it should be appreciated that the techniques disclosed herein may additionally or alternatively apply to discrete Fourier transform (DFT) spread OFDM (DFT-s-OFDM) symbols and/or single carrier waveform related symbols, such as single carrier-quadrature amplitude modulation (SC-QAM) symbols.

In one aspect, the base station 102/180 may identify one or more potential time instances within the payload of an OFDM symbol to trigger the beam switch and to terminate early the payload. The time may be a function of the type of the low priority symbols whose payload may be terminated early, the type of the high priority symbols following the low priority symbols, the beam switching time, the link budget, the MCS of the low priority and high priority symbols, the channel conditions, etc. In one aspect, the base station 102/180 may determine if early termination is needed and the configuration for a beam switch. For example, the base station 102/180 may determine whether to initiate early Tx beam switching based on a predefined method. The predefined method may be known to both the base station 102/180 and the UE 104 so that the UE 104 may configure its Rx beam to receive the beamformed link after the early beam switching without requiring notification from the base station 102/180. Based on the predefined method, the UE 104 may also configure a time-shifted FFT window for the symbol whose payload is terminated early to capture signal samples of the payload prior to the Tx beam switching and to capture signal samples of a portion of the CP. The UE 104 may be configured to cyclically shift the captured signal samples of the CP portion to the end of the captured payload signal samples and to perform the FFT to extract the data modulated on the subcarriers of the OFDM symbol.

In one aspect, the base station 102/180 may determine to initiate early Tx beam switching if a low priority symbol is followed by a high priority symbol, or a symbol that has a low MCS is followed by a symbol with a high MCS. For example, the base station 102/180 may determine whether to initiate early Tx beam switching based on the beam switching time, the operating environment, and the capability of the UE 104 such as the tap delays of its Rx filter, or other parameters of its Rx path that may affect the time for a received switched beam to settle to a quiescent state. The base station 102/180 may receive information on the capability of the UE 104 through signaling from the UE 104 and may use the information to determine the beam switching time. For example, the base station 102/180 may determine to initiate early Tx beam switching if the beam switching time is longer or close to the length of the CP. In one aspect, the base station 102/180 may determine the configuration for the early Tx beam switching including the switching time based on the one or more potential time instances already identified. The configuration may include a weighted overlapping (Wola) window or other types of window filters that are applied to the early terminated OFDM symbol to control the amount of RF leakage into adjacent bands or channels to satisfy adjacent channel leakage (ACL) regulatory requirements. The configuration may include the new phases of the multiple phased antennas arrays to change the direction and/or the shape of the early switched beam.

In one aspect, the base station 102/180 may transmit the decision about, and the configuration of, the early Tx beam switching to the UE 104 to configure the UE 104 to receive the early switched beamformed link. In one aspect, the UE 104 may be configured for the early beam switching based on the predefined method so the UE 104 does not need notification from the base station 102/180. The base station 102/180 may terminate the payload of a low priority symbol and may initiate early Tx beam switching at the determined time. In one aspect, the base station 102/180 may apply the Wola window or other types of window filters to the early terminated OFDM symbol and may apply the new phases to the multiple phased antennas arrays to change the beam direction or beam shape.

In one aspect, to receive early switched UL beamformed link from the UE 104, the base station 102/180 may configure its Rx beam to receive the beamformed link. The base station 102/180 may also configure a time-shifted FFT window for the symbol whose payload is terminated early to capture signal samples of the payload prior to the Tx beam switching and signal samples of a portion of the CP. The base station 102/180 may be configured to cyclically shift the captured signal samples of the CP portion to the end of the captured payload signal samples and to perform the FFT to extract the UL data modulated on the subcarriers of the OFDM symbol.

In one aspect, the UE 104 may identify one or more potential time instances within the payload of an OFDM symbol to trigger the beam switch and to terminate early the payload for UL. The time may be a function of the type of the low priority symbols whose payload may be terminated early, the type of the high priority symbols following the low priority symbols, the beam switching time, the link budget, the MCS of the low priority and high priority symbols, the channel conditions, etc. In one aspect, the UE 104 may determine if early termination is needed and the configuration for a beam switch. For example, the UE 104 may determine whether to initiate early Tx beam switching based on a predefined method. The predefined method may be known to both the UE 104 and the base station 102/180 so that the UE 104 may configure its Rx beam to receive the DL beamformed link after the early beam switching or to configure its Tx beam to initiate the early beam switching for UL without requiring notification from the base station 102/180. Based on the predefined method, the UE 104 may also configure a time-shifted FFT window for the symbol whose payload is terminated early to capture signal samples of the payload prior to the Tx beam switching and signal samples of a portion of the CP. The UE 104 may be configured to cyclically shift the captured signal samples of the CP portion to the end of the captured payload signal samples and to perform the FFT to extract the data modulated on the subcarriers of the OFDM symbol. In one aspect, the UE 104 may receive the decision about, and the configuration of, early Tx beam switching from the base station 102/180 to configure the UE 104 to receive the early switched DL beamformed link or to configure its Tx beam to initiate the early beam switching for UL.

In one aspect, the UE 104 may determine to initiate early Tx beam switching if a low priority symbol is followed by a high priority symbol, or a symbol that has a low MCS is followed by a symbol with a high MCS. In one aspect, the UE 104 may determine whether to initiate early Tx beam switching based on the beam switching time, the operating environment, and the capability of the UE 104 such as the tap delays of its Tx filter, or other parameters of its Tx path that may affect the beam switching time. For example, the UE 104 may determine to initiate early Tx beam switching if the beam switching time is longer or close to the length of the CP. In one aspect, the UE 104 may determine the configuration for the early Tx beam switching including the switching time based on the one or more potential time instances already identified. The configuration may include a Wola window or other types of window filters that are applied to the early terminated OFDM symbol to control the amount of RF leakage into adjacent bands or channels to satisfy adjacent channel leakage (ACL) regulatory requirements. The configuration may include the new phases of the multiple phased antennas arrays to change the direction and/or the shape of the early switched beam.

In one aspect, the UE 104 may terminate the payload of a low priority symbol and may initiate early UL Tx beam switching at the determined time. In one aspect, the UE 104 may apply the Wola window or other types of window filters to the early terminated OFDM symbol and may apply the new phases to the multiple phased antennas arrays to change the beam direction or beam shape.

Figure 2:
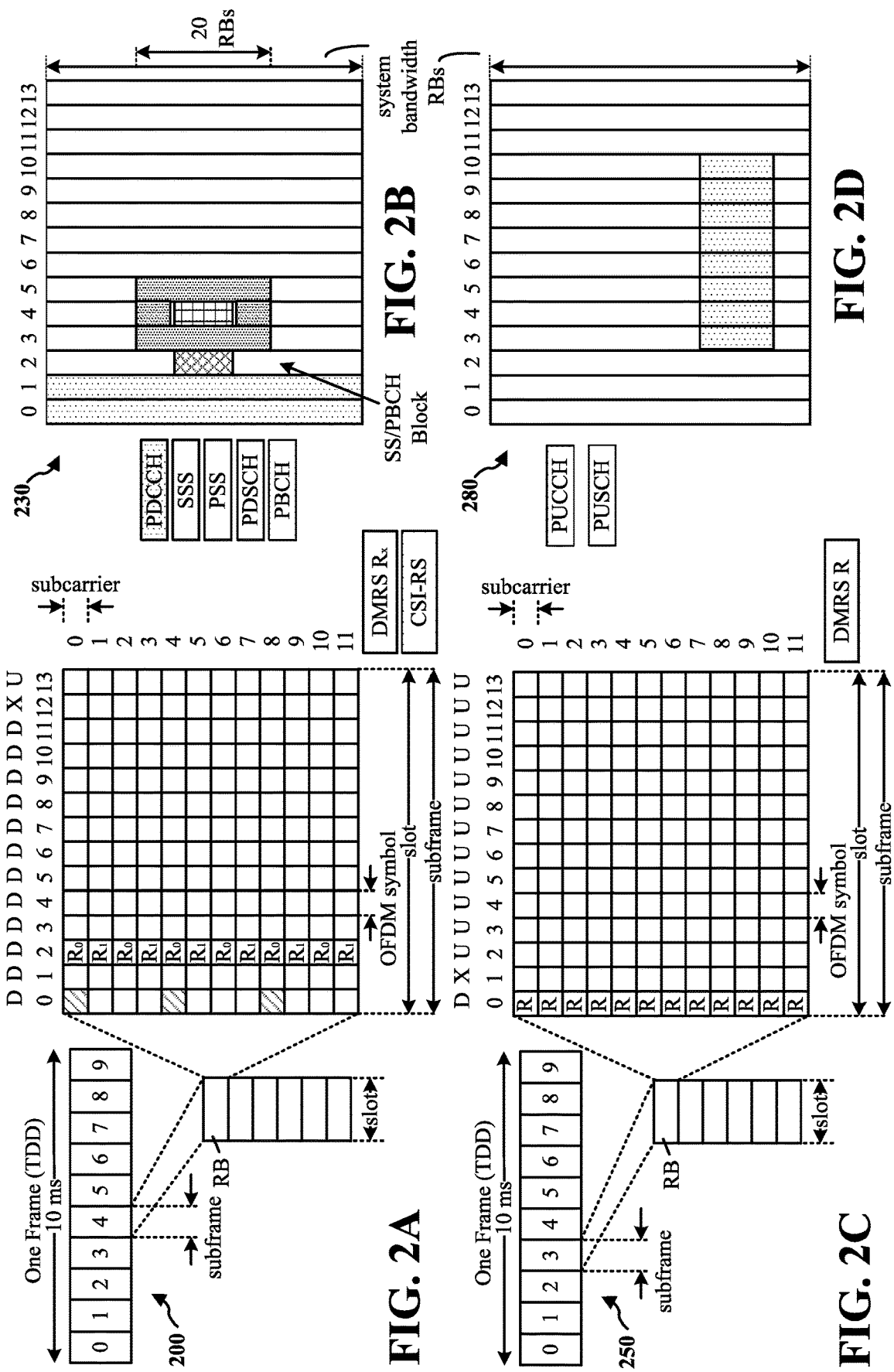
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A to 2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
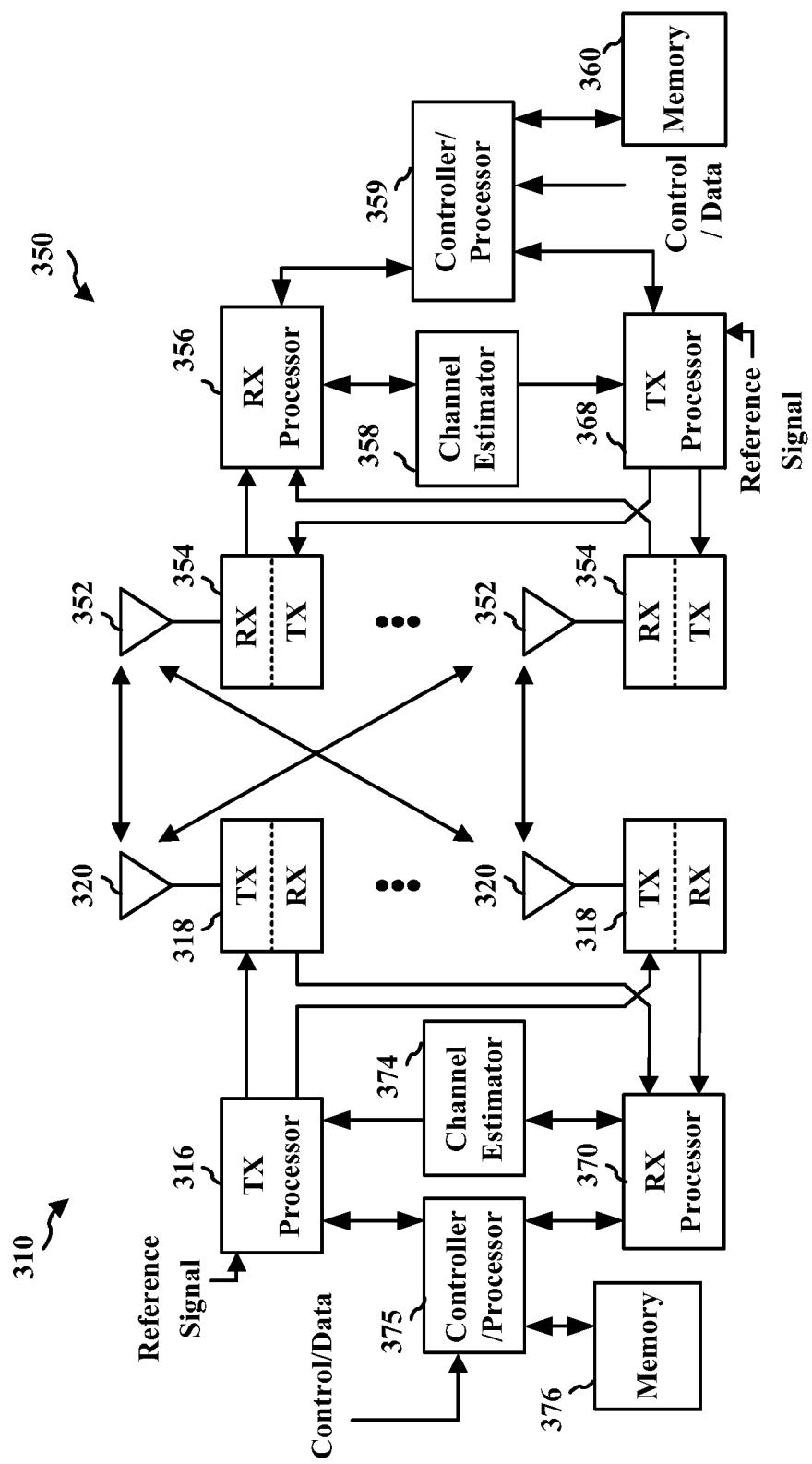
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam switch component 198 of FIG. 1.

At least one of the TX processor 316, the RX processor 370, and the controller/processor 375 may be configured to perform aspects in connection with the beam switch component 198 of FIG. 1.

Wireless communication systems may use the antenna gain of directional beamforming to meet a link budget. For example, a 5G/NR device operating in the millimeter wavelength may use beamforming to compensate for the high path loss and short range that may be experienced with such shorter wavelengths. Switching a beam shape or beam direction may help to maintain system robustness and improve throughput. For example, devices may switch beams when performing a beam sweep using reference signals or when transmitting data and/or control channels. In another example, devices may switch beams when transitioning between transmitting loss-tolerant data using a wider beam and transmitting high-reliability reference signals using a narrower beam. Devices may change beam directions or beam shapes by varying the phase shifts of antenna array elements that are combined to generate a beam pattern. However, when a beam is switched, there may be a delay of hundreds of ns from the time a device initiates or triggers a beam switch to when the beam settles to the expected value. During this transition period, sometimes called a "beam switching time," the beam might not be able to be reliably used.

To ameliorate the effects of an unsettled beam during the transition period, transmitter beam switching may occur during the cyclic prefix (CP) portion of an orthogonal frequency division multiplex (OFDM) symbol. A receiver receiving the OFDM symbol may perform a fast frequency transform (FFT) on the payload portion of the OFDM symbol. Thus, transient signals in the CP caused by the beam switching may be ignored. However, when the beam switching time is too long, for example, when caused by channel delays and the transient response of the transmit (Tx) and receive (Rx) filters in the Tx/Rx signal paths, the transient effect of the beam switching may leak into the payload portion of the received OFDM symbol. Such leakage may corrupt the circular structure of the CP-OFDM symbol, similar to the effect of inter-symbol interference (ISI) when the channel delay is longer than the CP. The result may be an increase in error vector magnitude (EVM) and decoding errors that may lead to packet loss. The degree of data decoding errors and packet loss may be a function of the type of payload carried by the OFDM symbols. For example, if the OFDM payload is a demodulation reference signal (DM-RS) used by the receiving device for channel estimation and demodulation, EVM loss on the DM-RS symbol may propagate to the demodulation and decoding of subsequent symbols. On the other hand, if the OFDM payload is a data symbol, the EVM loss on the data symbol may be localized and the impact on packet loss may be better contained. In another example, symbols that are transmitted with a low modulation coding scheme (MCS) and, thus, generally more tolerant of EVM loss, may experience less decoding errors than symbols transmitted with higher MCS.

Example techniques disclosed herein include triggering early Tx beam switching before the payload portion of an OFDM symbol ends so as to protect a subsequent symbol from the transient effects of an unsettled beam during the transitioning period. In one aspect, the subsequent symbol to protect may be a "high priority symbol," such as symbols containing DM-RS signals used for channel demodulation and demodulation by a receiver, or channel state information reference signals (CSI-RS) used by a receiver to estimate channels for generating the receiver channel quality indicator (CQI), precoding matrix indicator (PMI), or rank indicator (RI) measurements. In one aspect, the subsequent symbol may be a data symbol that has high MCS, high coding rate, and/or relatively more stringent reliability requirements.

In one aspect, the symbol whose payload is terminated early by the Tx beam switching may be a data symbol such as the physical downlink control channel (PDCCH) that may have lower MCS, lower coding rate, and/or other symbols that may be relatively more tolerant of decoding errors. In one aspect, the receiver receiving the symbol whose payload is terminated early by the Tx beam switching may use a time-shifted FFT window to capture signal samples of the payload prior to the start of the Tx beam switching as well as to capture signal samples of a portion of the CP. The receiver may cyclically shift the captured signal samples of the CP portion to the end of the captured payload signal samples before performing the FFT. The effect is that the signal samples of the payload that are not captured after the start of the Tx beam switching may be replaced by the captured signal samples from the CP. Due to the cyclic structure of the CP-OFDM symbol, the receiver may extract, demodulate, and decode the payload data modulated on the OFDM sub-carriers. Because the symbol may have lower MCS, even if some of the captured CP signal samples experience an increase in EVM loss due to distortion or transient effects caused by ISI, the receiver may still correctly decode the payload data.

Figure 5:
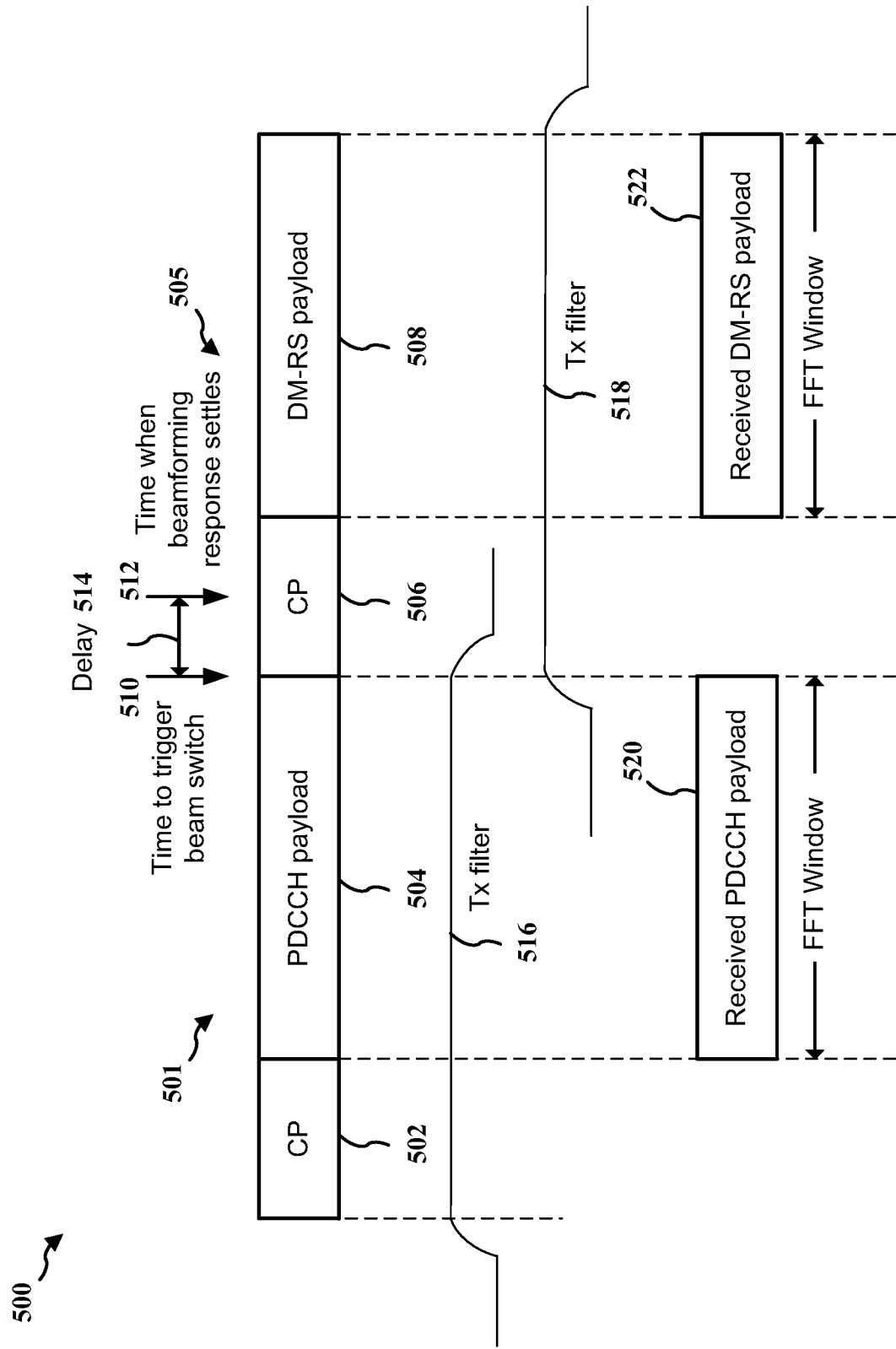
FIG. 5 is a diagram illustrating the timing of Tx beam switching with respect to two OFDM symbols at a transmitter with no early termination of a payload and the timing of the FFT window used to capture and extract signal samples at a receiver.

FIG. 5 is a diagram 500 illustrating the timing of Tx beam switching with respect to two OFDM symbols 501, 505 at a transmitter with no early termination of a payload and the timing of the FFT window used to capture and extract signal samples at a receiver. A transmitter such as that of the base station 180 or the UE 104 of FIG. 1 may transmit two OFDM symbols 501, 505. A first OFDM symbol 501 includes a CP 502 and a PDCCH payload 504. The PDCCH payload 504 may be a low priority payload with low MCS and may be (generally) more tolerant of EVM loss. The CP 502 may comprise an end portion of the PDCCH payload 504. In one aspect, the CP 502 may comprise a final 600 ns portion of the PDCCH payload 504. The first OFDM symbol 501 may be transmitted with a wider beam. A second OFDM symbol 505 includes a CP 506 and a DM-RS payload 508. The CP 506 may comprise an end portion of the DM-RS payload 508. The DM-RS payload 508 may be a high priority payload with high MCS and (generally) high reliability requirements because the DM-RS signal may be used for channel demodulation and demodulation by a receiver. The second OFDM symbol 505 may be transmitted with a narrower beam and a higher antenna gain than the beam of the first OFDM symbol 501.

The transmitter may trigger a beam switch 510 at the start of the CP 506 of the second OFDM symbol 505 to switch from the beam of the first OFDM symbol to the beam of the second OFDM symbol. For example, the transmitter may change the phases of the multiple phased antennas arrays at beam switch trigger 510 to change the beam direction and/or the beam shape. Due to hardware latency associated with changing the beam, such as the latency associated with changing the phases of the multiple phased antennas arrays, the beam may not settle until a time instance 512 well into the CP 506. In one aspect, a delay 514 from the trigger of the beam switch 510 to the beam response settled time 512 may be 200-300 ns. In addition to the delay 514 on the transmitter, the impact of switching the beams may have a delayed impact into the DM-RS payload 508 of the second OFDM symbol 505, e.g. due to delay taps of the channel, transmitter/receiver filter, and the receiver front-end, etc., even if the delay 514 does not exceed the length of CP 506. During the beam switching time, the beam is in a transient state and the CP 506 may not be reliably demodulated and decoded. If the impact of the transient response during the beam switching time extends into the DM-RS payload 508, the cyclic structure of channel matrix associated with the CP 506 and the DM-RS payload 508 may be corrupted, resulting in EVM loss and decoding errors.

In one aspect, to satisfy adjacent channel leakage (ACL) requirements regulating the amount of channel leakage into the adjacent frequency band of the transmission, the transmitter may apply a first Tx filter 516 to the first OFDM symbol 501 and a second Tx filter 518 505 to the second OFDM symbol. The Tx filters 516, 518 may be the same or different, and may correspond to a weighted overlapping (Wola) window filter. A receiver may use a first FFT window to capture signal samples of the received PDCCH payload 520 of the first OFDM symbol 501. The receiver may use a second FFT window to capture signal samples of the received DM-RS payload 522 of the second OFDM symbol 505. The receiver may perform a first FFT on the first FFT window to extract the PDCCH signals modulated on the subcarriers of the first OFDM symbol 501. The receiver may perform a second FFT on the second FFT window to extract the DM-RS signals modulated on the subcarriers of the second OFDM symbol 505. If the negative impact of the beam switching time does not extend into the received DM-RS payload 522 and, thus, falls outside of the second FFT window, the receiver may correctly extract, demodulate, and decode the DM-RS signals.

Figure 6:
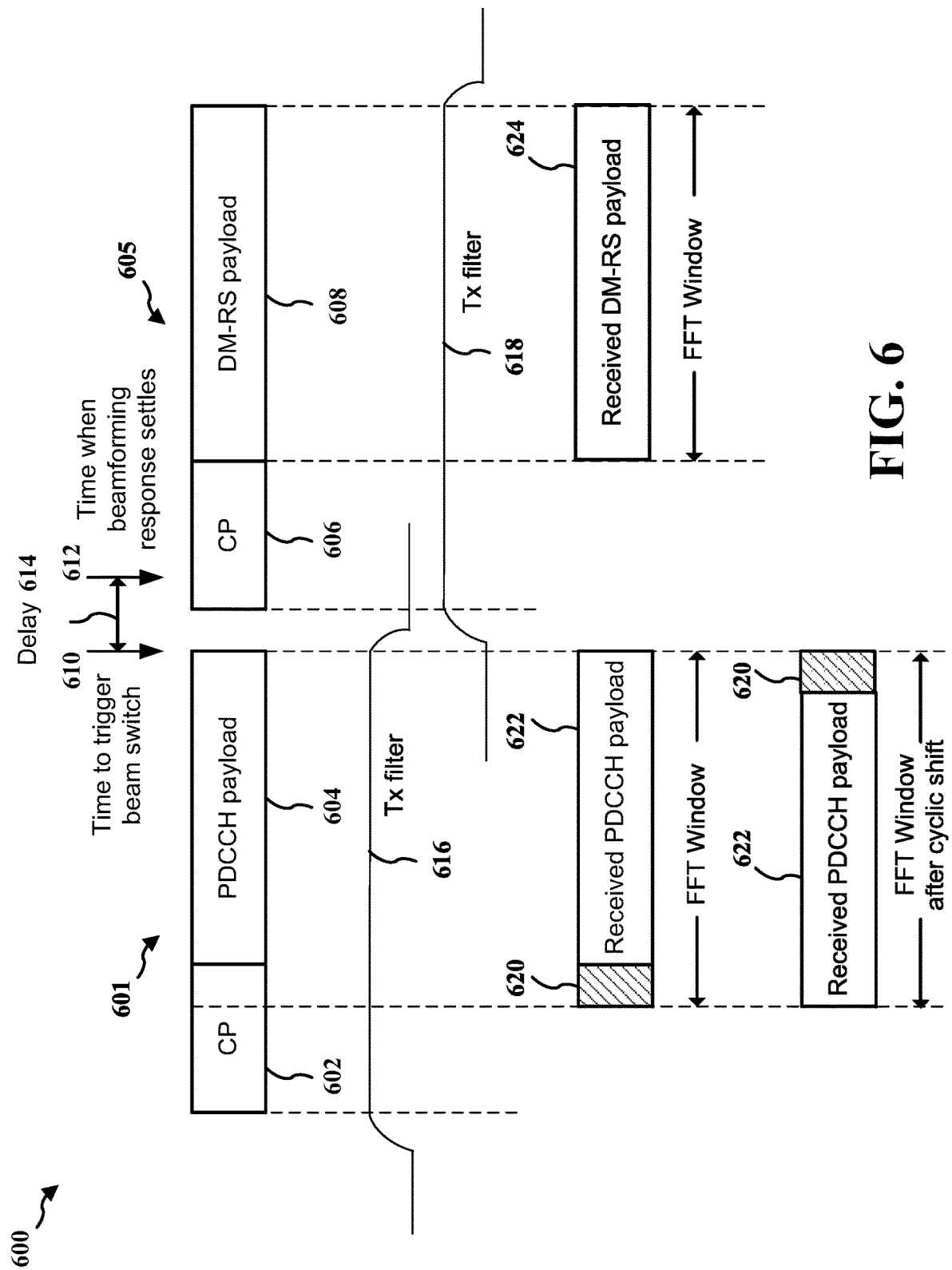
FIG. 6 is a diagram illustrating the timing of early Tx beam switching with respect to two OFDM symbols at a transmitter that results in early termination of a payload and the timing of the FFT window used to capture and extract signal samples at a receiver.

FIG. 6 is a diagram 600 illustrating the timing of early Tx beam switching with respect to two OFDM symbols 601, 605 at a transmitter that results in early termination of a payload and the timing of the FFT window used to capture and extract signal samples at a receiver. A transmitter such as that of the base station 180 or the UE 104 of FIG. 1 may transmit two OFDM symbols 601, 605. A first OFDM symbol 601 includes a CP 602 and a PDCCH payload 604. The PDCCH payload 604 may be a low priority payload with low MCS and may be (generally) more tolerant of EVM loss, similar to the PDCCH payload 504 of FIG. 5. The first OFDM symbol 601 may be transmitted with a wider beam. A second OFDM symbol 605 includes a CP 606 and a DM-RS payload 608. The DM-RS payload 608 may be a high priority payload, as the DM-RS payload 508 of FIG. 5. Also as in FIG. 5, the second OFDM symbol 605 may be transmitted with a narrower beam and a higher antenna gain than the beam of the first OFDM symbol 501.

However, unlike the full PDCCH payload 504 of FIG. 5, the PDCCH payload 604 may be terminated early because the transmitter may trigger a beam switch 610 prior to the end of the full length PDCCH payload 504 of FIG. 5, or before the start of the CP 606 of the second OFDM symbol 605. Because of the early terminated PDCCH payload 604, the CP 602 of the first OFDM symbol 601 may include an end portion of the early terminated PDCCH payload 604 concatenated with the missing portion of the full length PDCCH payload 504 of FIG. 5 terminated by the early beam switch trigger 610. That is, a portion of the CP 602 of the first OFDM symbol 601 may comprise the missing portion of the full length PDCCH payload 504 between the early beam switch trigger 610 and the CP 606 of the second OFDM symbol 605. The length of the CP 602 to guard against inter-symbol interference (ISI) may be reduced by the length of time between the early beam switch trigger 610 and the CP 606 of the second OFDM symbol 605, making the first OFDM symbol 601 more susceptible to ISI. However, because the PDCCH payload 604 is a low priority payload with low MCS that is more tolerant of EVM loss, the receiver may still be able to correctly extract, demodulate, and decode the PDCCH signals even if there is an increase in EVM loss due to distortion or transient effects caused by the early termination. The transmitter may apply a first Tx filter 616 to the first OFDM symbol 601 to satisfy ACL requirements. Because of the early terminated PDCCH payload 604, the first Tx filter 616 may start at the start of the CP 602 as the first TX filter 516 of FIG. 5, but may end earlier compared to the first TX filter 516. The first Tx filter 616 may be a Wola window (sometimes referred to as a "Wola filter" or a "Wola window filter").

A receiver receiving the first OFDM symbol 601 may use a time-shifted FFT window to capture signal samples of a received PDCCH payload 622 prior to the early beam switch trigger 610 as well as signal samples of a portion 620 of the CP 602. The receiver may cyclically shift the captured signal samples of the portion 620 of the CP 602 to the end of the captured signal samples of the received PDCCH payload 622 before performing the FFT. The effect is that the missing signal samples of the full length PDCCH payload 504 after the start of the early beam switch trigger 610 may be replaced by the captured signal samples from the portion 620 of the CP 602. Due to the cyclic structure of the CP-OFDM symbol, the receiver may extract, demodulate, and decode the PDCCH signals modulated on the OFDM sub-carriers.

Due to the early beam switch trigger 610, the beam may settle at a time instance 612 within the CP 606 of the second OFDM symbol 605 that is earlier than the time instance 512 of FIG. 5, reducing the probability that the beam switching time may extend into the DM-RS payload 608 to corrupt the high priority DM-RS payload 608. The transmitter may apply a second Tx filter 618 to the second OFDM symbol 605 to satisfy ACL requirements. The second Tx filter 618 may be a Wola filter. A receiver may use a second FFT window to capture signal samples of a received DM-RS payload 624 of the second OFDM symbol 605, as in FIG. 5. The receiver may perform a second FFT on the second FFT window to extract the DM-RS signals modulated on the subcarriers of the second OFDM symbol 605.

Figure 7:
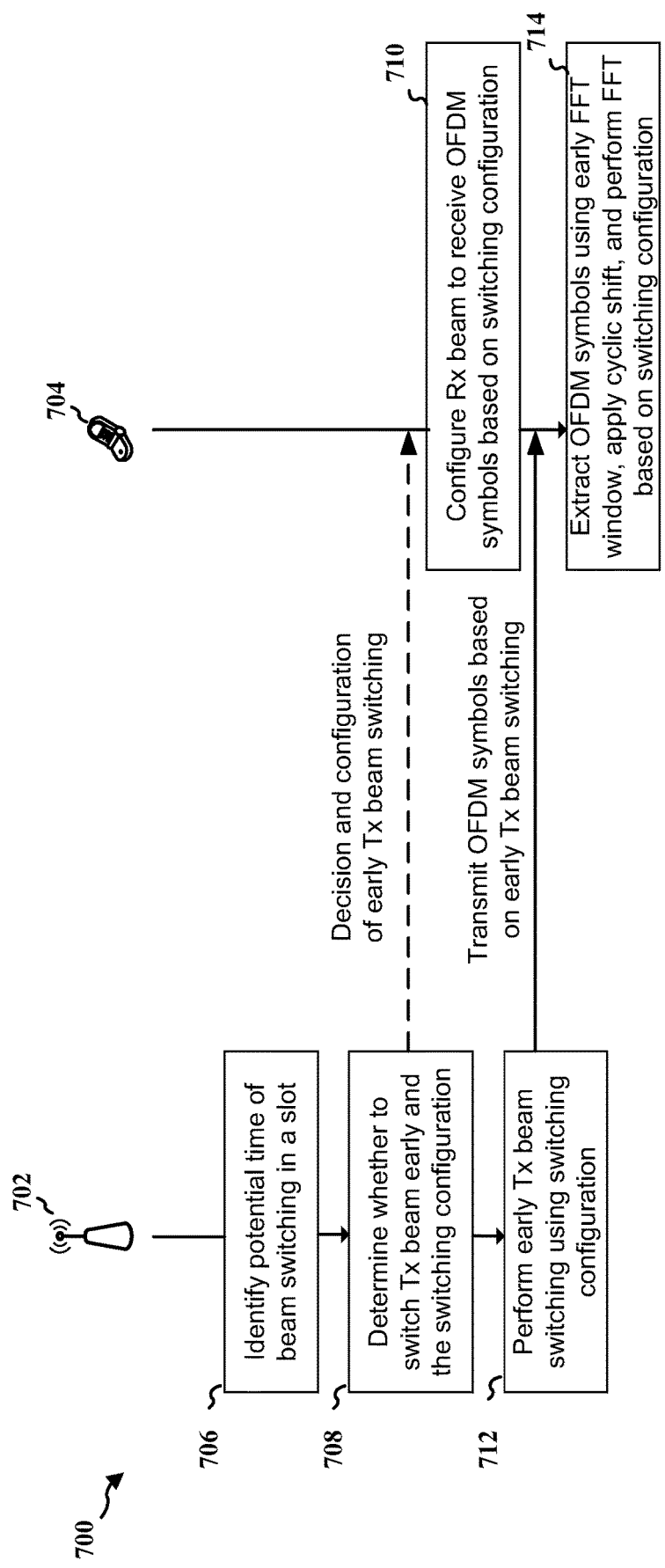
FIG. 7 is a diagram illustrating a call flow diagram between a base station and a UE when the base station employs early beam switching for downlink communication.

FIG. 7 is a diagram illustrating a call flow diagram 700 between a base station 702 and a UE 704 when the base station 702 employs early beam switching for downlink communication. The base station 702 may be the base station 180 of FIG. 1 and the UE 704 may be the UE 104 of FIG. 1. At 706, the base station 702 may identify one or more potential time instances within the payload of an OFDM symbol to trigger the beam switch and to terminate early the payload. The time may be a function of the type of the low priority symbols whose payload may be terminated early, the type of the high priority symbols following the low priority symbols, the beam switching time, the link budget, the MCS of the low priority and high priority symbols, the channel conditions, etc. For example, if the beam switching time is long due to the type of narrow beam needed to meet the link budget and the channel delay is long, there is not a strong multipath environment, and the MCS of the high priority symbol is not tolerant of EVM loss, the base station 702 may identify an earlier beam switch trigger time within the payload of a low priority OFDM symbol. Moving the beam switch trigger time to an earlier time instance within the payload of the low priority OFDM symbol reduces the probability that the beam switching time may extend into the payload of the high priority OFDM symbol. The cost is an increase in the susceptibility of the low priority OFDM symbol to ISI due to the earlier time-shifted FFT window within the CP of the low priority OFDM symbol. In one aspect, the base station 702 may identify a group of potential early beam switch trigger times and may select a time from the group at a later time. The base station 702 may specify the early beam switch trigger time of a transmission associated with a transmission configuration indicator (TCI) state.

At 708, the base station 702 may determine if early termination is needed and the configuration for a beam switch. For example, the base station 702 may determine whether to initiate early Tx beam switching based on a predefined method. The predefined method may be known to both the base station 702 and the UE 704 so that the UE 704 may configure its Rx beam to receive the beamformed link after the early beam switching without requiring notification from the base station 702.

In one aspect, the base station 702 may determine to initiate early Tx beam switching if a low priority symbol is followed by a high priority symbol, or a symbol that has a low MCS is followed by a symbol with a high MCS. In one aspect, the high priority symbol may contain DM-RS signals used by the UE 704 for channel demodulation and demodulation, or CSI-RS used by the UE 704 to estimate channels for generating the receiver CQI, PMI, or RI measurements. In one aspect, the high priority symbol may have relatively more stringent reliability requirements. In one aspect, the low priority symbol may contain PDCCH, or other symbols that may be more tolerant of EVM loss or decoding errors. In one aspect, the base station 702 may determine whether to initiate early Tx beam switching based on the beam switching time, the operating environment, and/or the capability of the UE 704 such as the tap delays of its Rx filter, or other parameters of its Rx path that may affect the beam switching time. In one aspect, the base station 702 may receive information on the capability of the UE 704 through signaling from the UE 704 and may use the information to determine the beam switching time. For example, the base station 702 may determine to initiate early Tx beam switching if the beam switching time is longer than or close to the length of the CP. In one aspect, the base station 702 may determine the configuration for the early Tx beam switching including the switching time based on the one or more potential time instances identified at 706. The configuration may include a Wola window or other types of window filters that are applied to the early terminated OFDM symbol to control the ACL. The configuration may include the new phases of the multiple phased antennas arrays to change the direction and/or the shape of the early switched beam.

In one aspect, if the decision for the early Tx beam switching is not based on the predefined method, the base station 702 may transmit the decision about, and the configuration of, the early Tx beam switching to the UE 704 to configure the UE 704 to receive the early switched beamformed link. In one aspect, the base station 702 may transmit the decision and configuration information in the DCI of the PDCCH or the ePDCCH, through the RRC layer, or through the MAC layer. In one aspect, the UE 704 may be configured for the early beam switching based on the predefined method so the UE 704 does not need notification from the base station 702.

At 710, the UE 704 may configure its Rx beam to receive the early switched beamformed link based on the decision and configuration information of the early Tx beam switching received from the base station 702. In one aspect, the UE 704 may configure its Rx beam based on the predefined method. For example, the UE 704 may configure its Rx beam to receive the CP and the early terminated payload of the low priority OFDM symbol based on the direction and shape of the Tx beam carrying the low priority OFDM symbol from the base station 702. After receiving the low priority OFDM symbol, the UE 704 may configure its Rx beam to receive the CP and the payload of the high priority OFDM based on the direction and shape of the Tx beam carrying the high priority OFDM symbol.

At 712, the base station 702 may perform the early Tx beam switching of the low priority OFDM symbol using the switching configuration from 708 and may transmit the low priority and high priority OFDM symbols to the UE 704. The base station 702 may terminate the payload of the low priority symbol and may initiate early Tx beam switching at the time determined at 708. In one aspect, the base station 702 may apply the Wola windows or other types of window filters to the early terminated low priority OFDM symbol and to the high priority OFDM symbols and may apply the new phases to the multiple phased antennas arrays to change the beam direction and/or beam shape. In one aspect, the base station 702 may terminate the payload of the low priority symbol, trigger early Tx beam switch, and apply the Wola filters as shown in FIG. 6.

At 714, the UE 704 may configure the time-shifted FFT window for the low priority symbol whose payload is terminated early to capture the signal samples of the low priority symbol payload prior to the Tx beam switching and the signal samples of a portion of the CP. The UE 704 may configure the time-shifted FFT window based on the switching configuration received from the base station 702. In one aspect, the UE 704 may configure the time-shifted FFT window based on the predefined method. The UE 704 may be configured to cyclically shift the captured signal samples of the CP portion to the end of the captured payload signal samples and to perform the FFT to extract the data modulated on the subcarriers of the low priority OFDM symbol. In one aspect, the signal samples of the low priority symbol payload captured by the FFT window may be the received payload 622 of FIG. 6, and the signal samples of the portion of the CP of the low priority symbol captured by the FFT window may be the portion 620 of the CP 602 of FIG. 6. Due to the cyclic structure of the CP-OFDM symbol, the UE 704 may extract, demodulate, and decode the signals modulated on the sub-carriers of the low priority OFDM symbol. For the high priority symbol, the UE 704 may align the FFT window with the payload to capture the signal samples of payload of the high priority symbol. The UE 704 may perform the FFT to extract the data modulated on the subcarriers of the high priority OFDM symbol.

Figure 8:
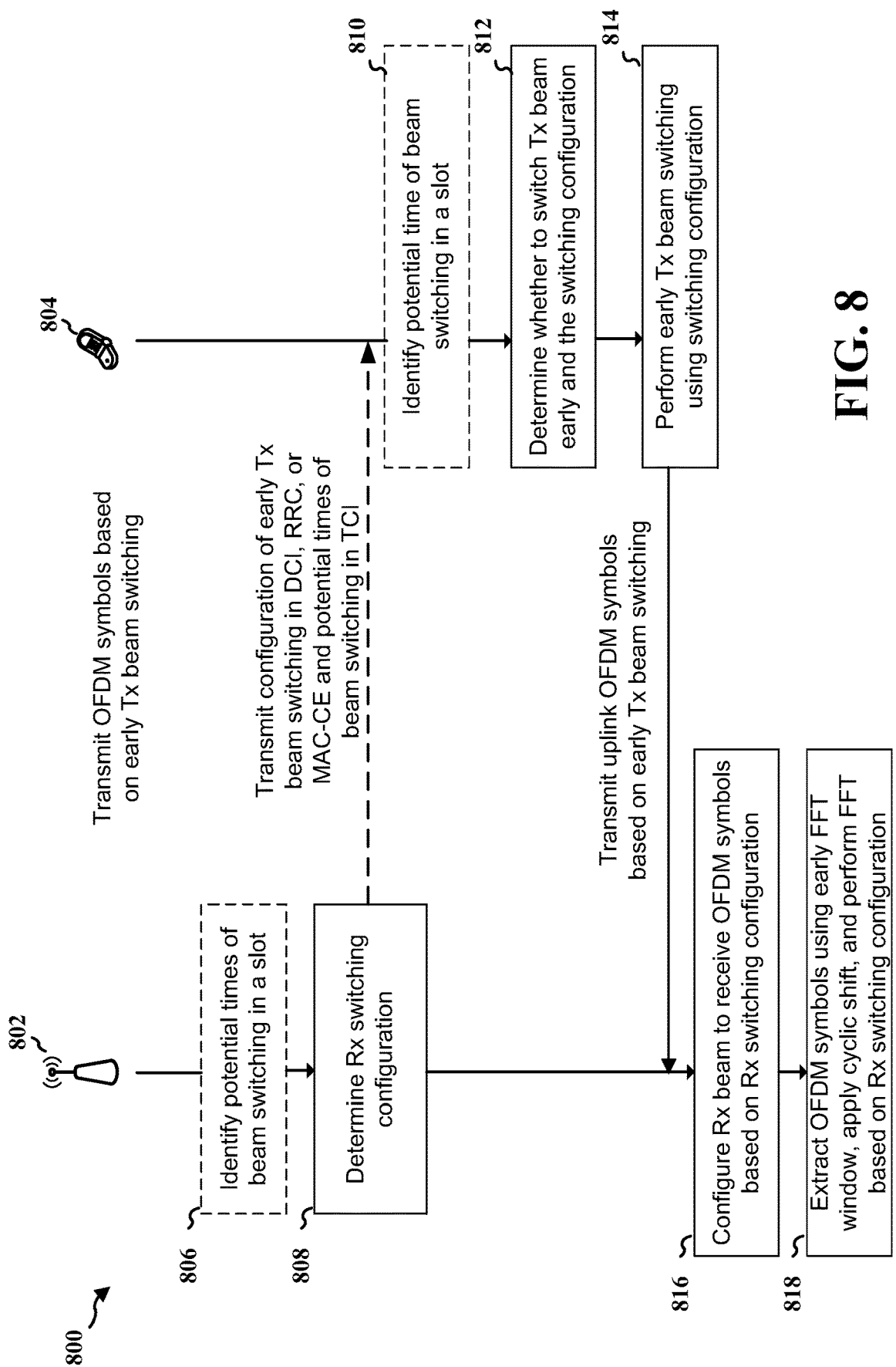
FIG. 8 is a diagram illustrating a call flow diagram between a base station and a UE when the UE employs early beam switching for uplink communication.

FIG. 8 is a diagram illustrating a call flow diagram 800 between a base station 802 and a UE 804 when the UE 804 employs early beam switching for uplink communication. The base station 802 may be the base station 180 of FIG. 1 or the base station 702 of FIG. 7, and the UE 804 may be the UE 104 of FIG. 1 or the UE 704 of FIG. 7. At 806, if the early Tx beam switching is not based on a predefined method known to both the base station 802 and the UE 804, the base station 802 may identify one or more potential time instances within the payload of a UL OFDM symbol for the UE 804 to trigger the beam switch and to terminate early the payload. The times may be a function of the type of the low priority symbols whose payload may be terminated early, the type of the high priority symbols following the low priority symbols, the beam switching time, the link budget, the MCS of the low priority and high priority symbols, the channel conditions, etc. In one aspect, the base station 802 may receive information on the capability of the UE 804 through signaling from the UE 804 and may use the information to determine the beam switching time or to identify the potential time instances for the early Tx beam switch. In one aspect, the base station 802 may transmit a signal to the UE 804 to specify the determined early beam switch trigger time of the UE 804.

At 808, the base station 802 may determine the configuration for an early UL Rx beam switch at the base station 802 to receive the UL beams. In one aspect, the base station 802 may determine the configuration for an early UL Tx beam switch of the UE 804. In one aspect, the base station 802 may receive information on the capability of the UE 804 through signaling from the UE 804 and may use the information to determine the configuration for the early UL Tx beam switch. The configuration may include a Wola window or other types of window filters that are applied to the early terminated OFDM symbol to control the ACL. The configuration may include the new phases of the multiple phased antennas arrays to change the direction and/or the shape of the early switched beam. The base station 802 may transmit the configuration information of the early Tx beam switching to the UE 804 to configure the UE 804 to transmit the early switched beamformed link. In one aspect, the base station 802 may transmit the configuration information or the early beam switch triggers times in the DCI of the PDCCH or the ePDCCH, through the RRC signaling, or through the MAC-CE signaling.

At 810, if the early Tx beam switching is based on a predefined method known to both the base station 802 and the UE 804, the UE 804 may identify one or more potential time instances within the payload of a UL OFDM symbol for the UE 804 to trigger the beam switch and to terminate early the payload without relying on the signaling from the base station 802. The times may be a function of the type of the low priority symbols whose payload may be terminated early, the type of the high priority symbols following the low priority symbols, the beam switching time, the link budget, the MCS of the low priority and high priority symbols, the channel conditions, etc.

At 812, the UE 804 may determine to initiate the early Tx beam switching if a low priority symbol is followed by a high priority symbol, or a symbol that has a low MCS is followed by a symbol with a high MCS. In one aspect, the high priority symbol may have relatively more stringent reliability requirements. In one aspect, the low priority symbol may be more tolerant of EVM loss or decoding errors. In one aspect, the UE 804 may determine whether to initiate the early Tx beam switching based on the beam switching time, the operating environment, and the capability of the UE 804 such as the tap delays of its Tx filter, or other parameters of its Tx path that may affect the beam switching time. In one aspect, if the UE 804 does not receive configuration information from the base station 802, the UE 804 may determine the configuration for the early Tx beam switching including the switching time based on the one or more potential time instances identified at 810. The configuration may include a Wola window or other types of window filters that are applied to the early terminated OFDM symbol to control the ACL. The configuration may include the new phases of the multiple phased antennas arrays to change the direction and/or the shape of the early switched beam.

At 814, the UE 804 may perform the early Tx beam switching of the low priority OFDM symbol using the switching configuration from 812 and may transmit the low priority and high priority OFDM symbols to the base station 802. The UE 804 may terminate the payload of the low priority symbol and may initiate early Tx beam switching at the time determined at 812. In one aspect, the UE 804 may apply the Wola windows or other types of window filters to the early terminated low priority OFDM symbol and to the high priority OFDM symbols and may apply the new phases to the multiple phased antennas arrays to change the beam direction or beam shape. In one aspect, the UE 804 may terminate the payload of the low priority symbol, trigger early Tx beam switch, and apply the Wola filters as shown in FIG. 6.

At 816, the base station 802 may configure its Rx beam to receive the early switched UL beamformed link based on the configuration for the early UL Rx beam switch from 808. For example, the base station 802 may configure its Rx beam to receive the CP and the early terminated payload of the low priority OFDM symbol based on the direction and shape of the Tx beam carrying the low priority OFDM symbol from the UE 804. After receiving the low priority OFDM symbol, the base station 802 may configure its Rx beam to receive the CP and the payload of the high priority OFDM based on the direction and shape of the Tx beam carrying the high priority OFDM symbol.

At 818, the base station 802 may configure the time-shifted FFT window for the low priority symbol whose payload is terminated early to capture the signal samples of the low priority symbol payload prior to the Tx beam switching and the signal samples of a portion of the CP. The base station 802 may configure the time-shifted FFT window based on the switching configuration determined at 808. The base station 802 may be configured to cyclically shift the captured signal samples of the CP portion to the end of the captured payload signal samples and to perform the FFT to extract the data modulated on the subcarriers of the low priority OFDM symbol. In one aspect, the signal samples of the low priority symbol payload captured by the FFT window may be the received payload 622 of FIG. 6, and the signal samples of the portion of the CP of the low priority symbol captured by the FFT window may be the portion 620 of the CP 602 of FIG. 6. Due to the cyclic structure of the CP-OFDM symbol, the base station 802 may extract, demodulate, and decode the signals modulated on the subcarriers of the low priority OFDM symbol. For the high priority symbol, the base station 802 may align the FFT window with the payload to capture the signal samples of payload of the high priority symbol. The base station 802 may perform the FFT to extract the data modulated on the subcarriers of the high priority OFDM symbol.

Figure 9:
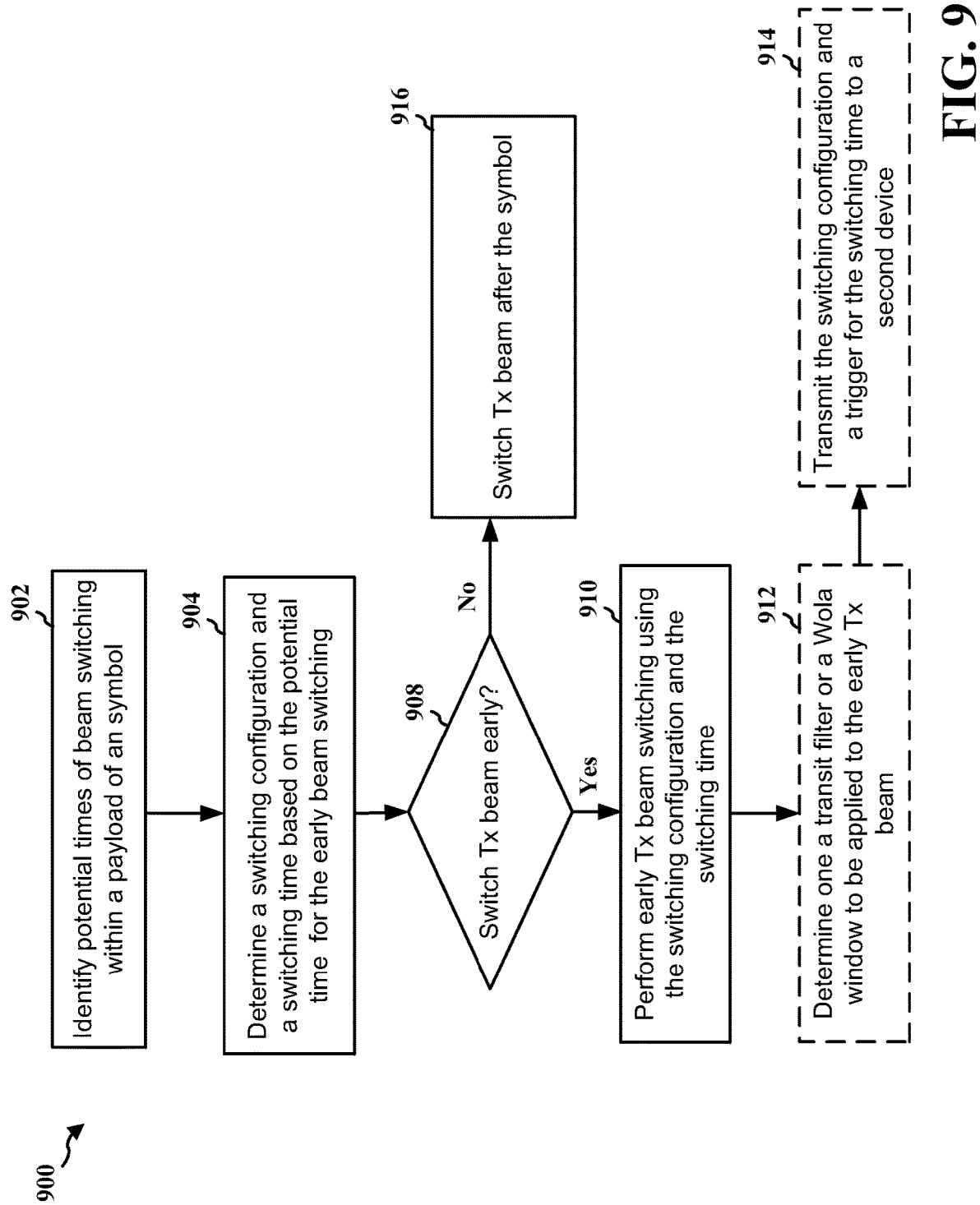
FIG. 9 is a flowchart of a method of wireless communication for a device to use early Tx beam switching to transmit OFDM symbols.

FIG. 9 is a flowchart of a method 900 of wireless communication for a device to use early Tx beam switching to transmit symbols. In an example, the symbols may comprise OFDM symbols. In another example, the symbols may comprise DFT-s-OFDM symbols. In another example, the symbols may comprise single carrier waveform related symbols, such as SC-QAM symbols. The method 900 may be performed by a base station (e.g., the base station 180 of FIG. 1, the base station 702 of FIG. 7, the base station 802 of FIG. 8, and/or the apparatus 1102/1102' of FIGS. 11/12, respectively) or a UE (e.g., the UE 104 of FIG. 1, the UE 704 of FIG. 7, the UE 804 of FIG. 8, and/or the apparatus 1102/1102' of FIGS. 11/12, respectively). The method may be performed by a processing system 1214 (of FIG. 12), which may include the memory 360 and which may be an entire UE 350 or base station 310 or may be a component of the UE 350, such as the TX processor 368, the RX processor 356, and/or the controller/processor 359, or a component of the base station 310, such as the TX processor 316, the RX processor 370, and/or the controller/processor 375. Optional aspects are illustrated with a dashed line. The method enables a device to trigger early Tx beam switching before the payload portion of an symbol ends so as to protect a subsequent symbol from the transient effects of an unsettled beam during a transitioning period.

At 902, the device may identify one or more potential time instances within the payload of an symbol to trigger the beam switch and to terminate early the payload. The identified potential time instance(s) (e.g., the potential early beam switch trigger time(s)) may be a function of the type of the low priority symbols whose payload may be terminated early, the type of the high priority symbols following the low priority symbols, the beam switching time, the link budget, the MCS of the low priority and high priority symbols, the channel conditions, etc. In one aspect, the device may identify a group of potential early beam switch trigger times and may select a time from the group at a later time. In one aspect, the device may identify an early beam switch trigger time within the payload of a low priority symbol. Moving the beam switch trigger time to a time instance within the payload of the low priority symbol reduces the probability that the beam switching time may extend into the payload of the following high priority symbol. The cost may be an increase in the susceptibility of the low priority symbol to ISI due to the earlier time-shifted FFT window within the CP of the low priority symbol. If the device is a base station communicating with a UE, the device may specify the early beam switch triggers time of a transmission by sending a signaling to a UE.

At 904, the device determines the configuration information and the switching time for the beam switch. In one aspect, the device may determine the configuration for the early Tx beam switching including the switching time based on the one or more potential time instances identified at 902. The configuration may include a Wola window or other types of window filters that are applied to the early terminated symbol to control the ACL. The configuration may include the new phases of the multiple phased antennas arrays to change the direction and/or the shape of the early switched beam.

At 908, the device determines whether to perform switching of the Tx beam early. In one aspect, the device may determine to initiate early Tx beam switching when a low priority symbol is followed by a high priority symbol, or when a symbol that has a low MCS is followed by a symbol with a high MCS. In one aspect, the device may determine whether to initiate early Tx beam switching based on the beam switching time, the operating environment, and/or the capability of the receiving device such as the tap delays of its Rx filter, or other parameters of its Rx path that may affect the beam switching time.

If, at 908, the device decides to switch the Tx beam early, then, at 910, the device performs the early Tx beam switching using the switching configuration and the switching time determined at 904. In one aspect, the device may terminate the payload of the low priority symbol and may initiate early Tx beam switching before the end of the payload of the low priority symbol at the switching time determined at 904.

At 912, the device may determine one of a transmit filter or a Wola window to be applied to the early Tx beam to, for example, reduce a leakage of a power of the early Tx beam into one or more adjacent frequency channels. In one aspect, the device may apply the Wola windows or other types of window filters to the early terminated low priority symbol and to the high priority symbols and may apply the new phases to the multiple phased antennas arrays to change the beam direction or beam shape.

At 914, the device may transmit the switching configuration and a trigger for the switching time to a second device.

If, at 908, the device decides not to switch the Tx beam early, then, at 916, the device may perform the Tx beam switching at the end of the payload of the current symbol or the beginning of the CP of the next symbol.

Figure 10:
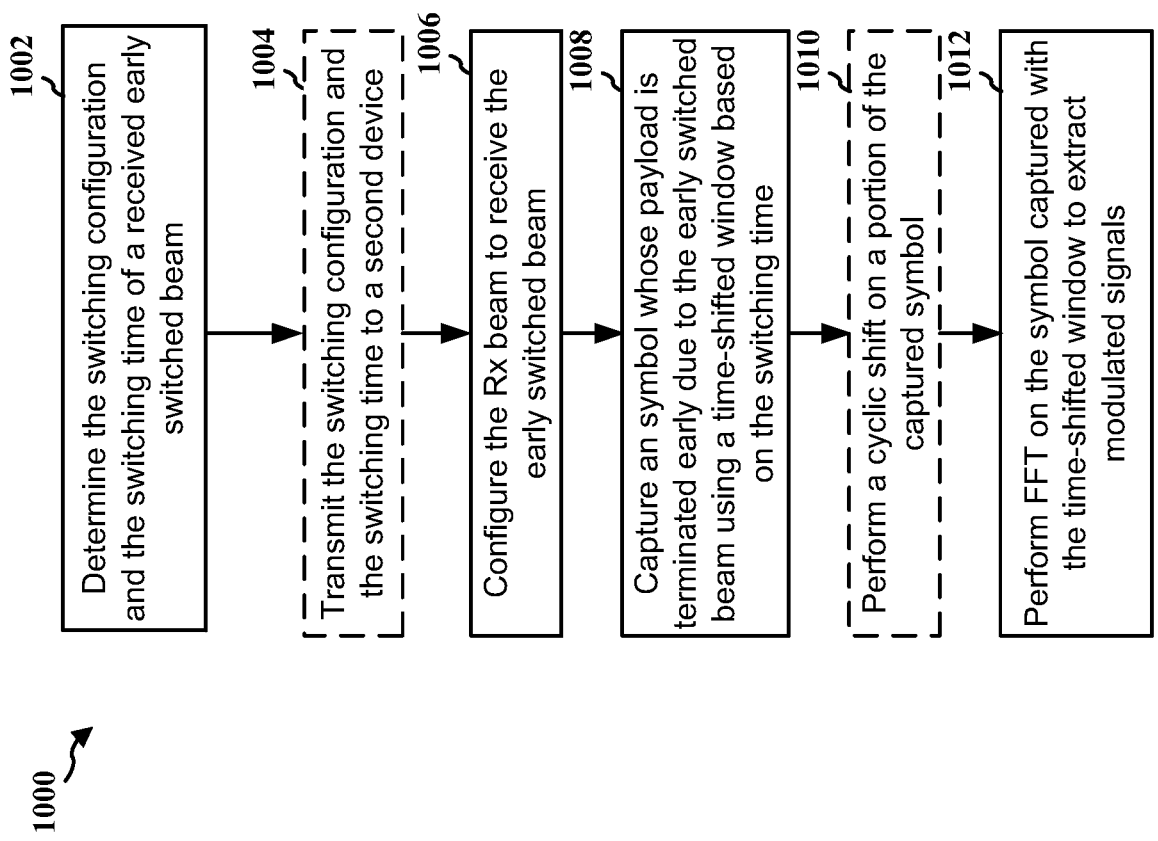
FIG. 10 is a flowchart of a method of wireless communication for a device to receive OFDM symbols that are terminated early for early Tx beam switching.

FIG. 10 is a flowchart of a method 1000 of wireless communication for a device to receive symbols that are terminated early for early Tx beam switching. The method 1000 may be performed by a base station (e.g., the gNB 180 of FIG. 1, the base station 702 of FIG. 7, the base station 802 of FIG. 8, and/or the apparatus 1102/1102' of FIGS. 11/12, respectively) or a UE (e.g., the UE 104 of FIG. 1, the UE 704 of FIG. 7, the UE 804 of FIG. 8, and/or the apparatus 1102/1102'). In an example, the symbols may comprise OFDM symbols. In another example, the symbols may comprise DFT-s-OFDM symbols. In another example, the symbols may comprise single carrier waveform related symbols, such as SC-QAM symbols. In an example, the time-shifted window may comprise a time-shifted FFT window. The method may be performed by processing system 1214, which may include the memory 360 and which may be an entire UE 350 or base station 310 or may be a component of the UE 350 such as the TX processor 368, the RX processor 356, and/or the controller/processor 359 or a component of the base station 310, such as the TX processor 316, the RX processor 370, and/or the controller/processor 375. Optional aspects are illustrated with a dashed line. The method enables a device to trigger early Tx beam switching before the payload portion of an symbol ends so as to protect a subsequent symbol from the transient effects of an unsettled beam during a transitioning period At 1002, the device may determine the switching configuration and the switching time of a received beam whose transmission was terminated early within the payload of an symbol. In one aspect, if the device is a base station communicating with a UE, the base station may determine the configuration for the early UL Tx beam switch of the UE. For example, the base station may determine the beam direction and the beam shape of the early terminated Tx beam of the UE. The base station may determine the configuration for its Rx beam to receive the CP and the early terminated payload of the UL symbol based on the direction and shape of the early terminated Tx beam of the UE. In one aspect, if the device is a UE communicating with a base station, the UE may receive the configuration of the DL Tx beam switch of the base station. In one aspect, the UE may receive the configuration information in the DCI of the PDCCH or the ePDCCH, through the RRC layer, or through the MAC layer. The UE may determine the configuration for its Rx beam to receive the CP and the early terminated payload of the DL symbol based on the configuration of the DL Tx beam switch of the base station. In one aspect, the UE may determine the configuration for its Rx beam for the early beam switching based on the predefined method so the UE does not need to receive the configuration information of the DL Tx beam switch from the base station.

In one aspect, the device may determine the switching time of the received beam whose transmission was terminated. In one aspect, if the device is a base station communicating with a UE, the base station may determine the switching time of the UL transmission as a function of the type of the low priority symbols whose payload may be terminated early, the type of the high priority symbols following the low priority symbols, the beam switching time, the link budget, the MCS of the low priority and high priority symbols, the channel conditions, etc. In one aspect, if the device is a UE communicating with a base station, the UE may receive the switching time of the DL transmission from the base station through a signaling from a second device (e.g., a base station).

At 1004, the device may transmit the switching configuration and the switching time to a second device.

At 1006, the device may configure its Rx beam to receive the early switched beamformed link based on the configuration information of the early Tx beam switching. For example, the device may configure its Rx beam to receive the CP and the early terminated payload of the low priority symbol based on the direction and shape of the Tx beam carrying the low priority symbol. After receiving the low priority symbol, the device may configure its Rx beam to receive the CP and the payload of the high priority based on the direction and shape of the Tx beam carrying the high priority symbol.

At 1008, the device may configure the time-shifted window for the low priority symbol whose payload is terminated early to capture the signal samples of the low priority symbol payload prior to the Tx beam switching and the signal samples of a portion of the CP. The base station 802 may configure the time-shifted window based on the switching configuration determined at 808.

At 1010, the device may perform a cyclic shift on a portion of the captured signal samples. For example, the base station 802 may be configured to cyclically shift the captured signal samples of the CP portion to the end of the captured payload signal samples.

At 1012, the device may perform the FFT on the captured and cyclically shifted signal samples of the early terminated symbol in the window to extract the data modulated on the subcarriers of the symbol.

Figure 11:
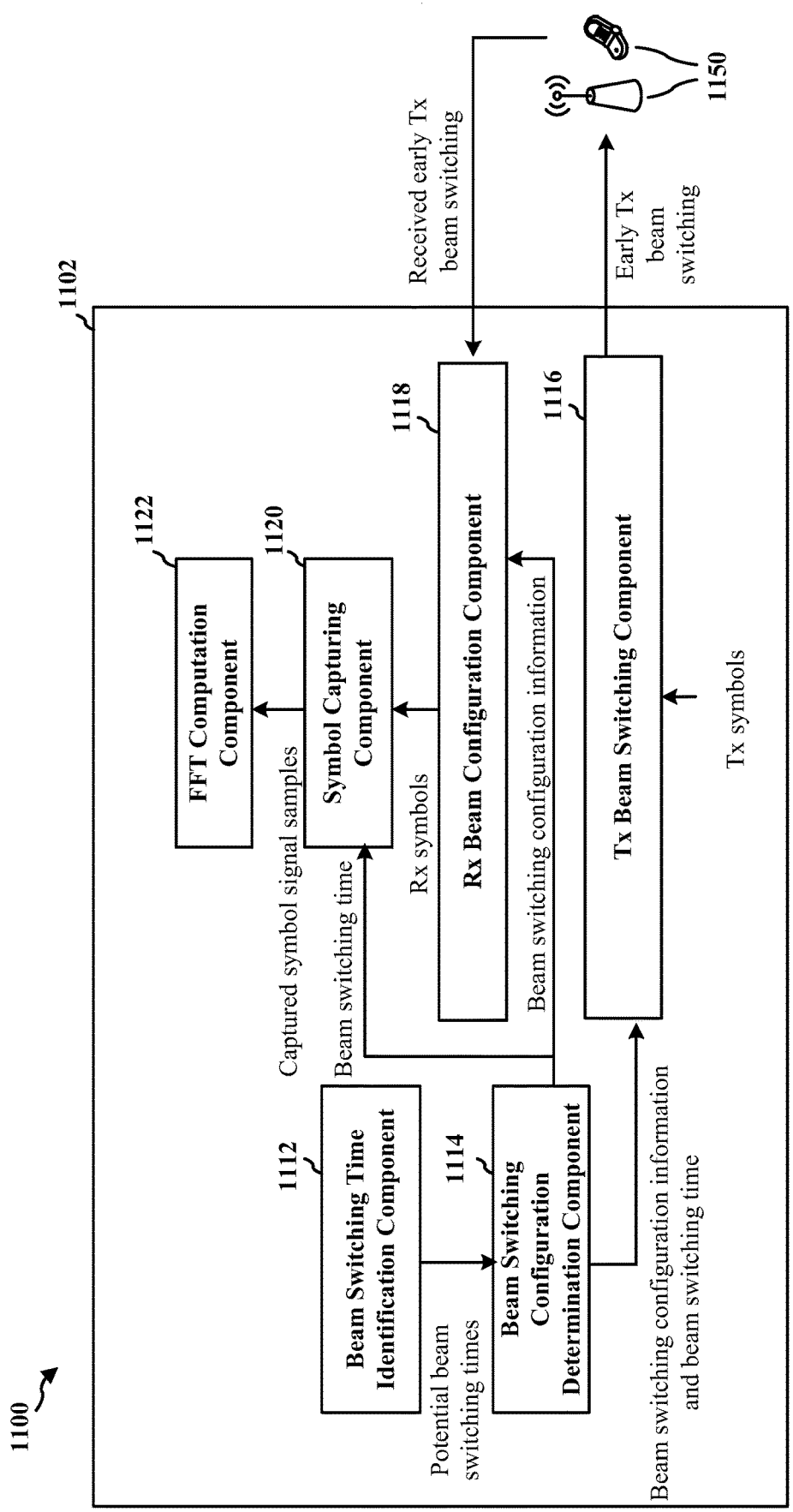
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus 1102 may correspond to a base station (such as the base station 180 of FIG. 1, the base station 702 of FIG. 7, and/or the base station 802 of FIG. 8) or may correspond to a UE (such as the UE 104 of FIG. 1, the UE 704 of FIG. 7, and/or the UE 804 of FIG. 8). The apparatus 1102 includes a beam switching time identification component 1112, a beam switching configuration determination component 1114, a Tx beam switching component 1116, an Rx beam configuration component 1118, an symbol capturing component 1120, and an FFT computation component 1122.

The beam switching time identification component 1112 is configured to identify one or more potential time instances within the payload of a symbol to trigger a beam switch and to terminate early the payload. The one or more identified potential time instances may be a function of the type of the low priority symbols whose payload may be terminated early, the type of the high priority symbols following the low priority symbols, the beam switching time, the link budget, the MCS of the low priority and high priority symbols, the channel conditions, etc. The beam switching time identification component 1112 may specify the early beam switch trigger time of a transmission using a signaling.

The beam switching configuration determination component 1114 may be configured to determine if early termination is needed and the configuration for a beam switch. The beam switching configuration determination component 1114 may be configured to determine to initiate early Tx beam switching if a low priority symbol is followed by a high priority symbol, or a symbol that has a low MCS is followed by a symbol with a high MCS. In one aspect, if the apparatus 1102 is a base station (e.g., the base station 180, the base station 702, and/or the base station 802), the high priority symbol may contain DM-RS signals used by the UE (e.g., the UE 104, the UE 704, and/or the UE 804) for channel demodulation and demodulation, or CSI-RS used by the UE to estimate channels for generating the receiver CQI, PMI, or RI measurements. In one aspect, the high priority symbol may have relatively more stringent reliability requirements. In one aspect, the low priority symbol may contain PDCCH, or other symbols that may be more tolerant of EVM loss or decoding errors. In one aspect, the beam switching configuration determination component 1114 of the base station may be configured to determine whether to initiate early Tx beam switching based on the beam switching time, the operating environment, and/or the capability of the UE such as the tap delays of its Rx filter, and/or other parameters of its Rx path that may affect the beam switching time. In one aspect, the beam switching configuration determination component 1114 of the base station may be configured to receive information on the capability of the UE through signaling from the UE and may use the information to determine the beam switching time. For example, the beam switching configuration determination component 1114 may be configured to determine to initiate early Tx beam switching if the beam switching time is longer than or close to the length of the CP. In one aspect, the beam switching configuration determination component 1114 may be configured to determine the configuration for the early Tx beam switching including the switching time based on the one or more potential time instances identified at 706. The configuration information may include a Wola window or other types of window filters that are applied to the early terminated symbol to control the ACL. The configuration may include the new phases of the multiple phased antennas arrays to change the direction and/or the shape of the early switched beam.

The Tx beam switching component 1116 may be configured to receive the Tx symbols that include a low priority symbol and a high priority symbol and may be configured to perform the early Tx beam switching of the low priority symbol using the switching configuration from the beam switching configuration determination component 1114. The Tx beam switching component 1116 may be configured to transmit the early Tx switched beam that includes the low priority symbols and the high priority symbols to an antenna 1150 (which may be a base station or a UE). The Tx beam switching component 1116 may be configured to terminate the payload of the low priority symbol and may initiate early Tx beam switching at the switching time determined by the beam switching configuration determination component 1114. In one aspect, the Tx beam switching component 1116 may apply the Wola windows or other types of window filters to the early terminated low priority symbol and to the high priority symbols and may apply the new phases to the multiple phased antennas arrays to change the beam direction or beam shape. In some examples, the Tx beam switching component 1116 may transmit the switching configuration and the trigger for the switching time to the antenna 1150.

The Rx beam configuration component 1118 may be configured to receive the early Tx switched beam from the antenna 1150. In one aspect, if the apparatus 1102 is a base station, the Rx beam configuration component 1118 may be configured to receive the early Tx switched beam based on the configuration information for the beam switching from the beam switching configuration determination component

1114. For example, the Rx beam configuration component 1118 may be configured to change its Rx beam to receive the CP and the early terminated payload of the low priority symbol based on the direction and shape of the Tx beam carrying the low priority symbol. After receiving the low priority symbol, the Rx beam configuration component 1118 may be configured to change its Rx beam to receive the CP and the payload of the high priority symbol based on the direction and shape of the Tx beam carrying the high priority symbol.

The symbol capturing component 1120 may be configured to time-shift the window for the low priority symbol whose payload is terminated early to capture the signal samples of the low priority symbol payload prior to the Tx beam switching and the signal samples of a portion of the CP. The symbol capturing component 1120 may configure the time-shifted window based on the beam switching time or the beam switching configuration information from the beam switching configuration determination component 1114. The symbol capturing component 1120 may be configured to cyclically shift the captured signal samples of the CP portion to the end of the captured payload signal samples.

The FFT computation component 1122 may perform the FFT on the captured and cyclically shifted signal samples of the early terminated symbol in the window to extract the data modulated on the subcarriers of the symbol.

The apparatus 1102 may include additional components that perform each of the blocks of the algorithm in the aforementioned flowcharts of FIGS. 9 and/or 10. As such, each block in the aforementioned flowcharts of FIGS. 9 and/or 10 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
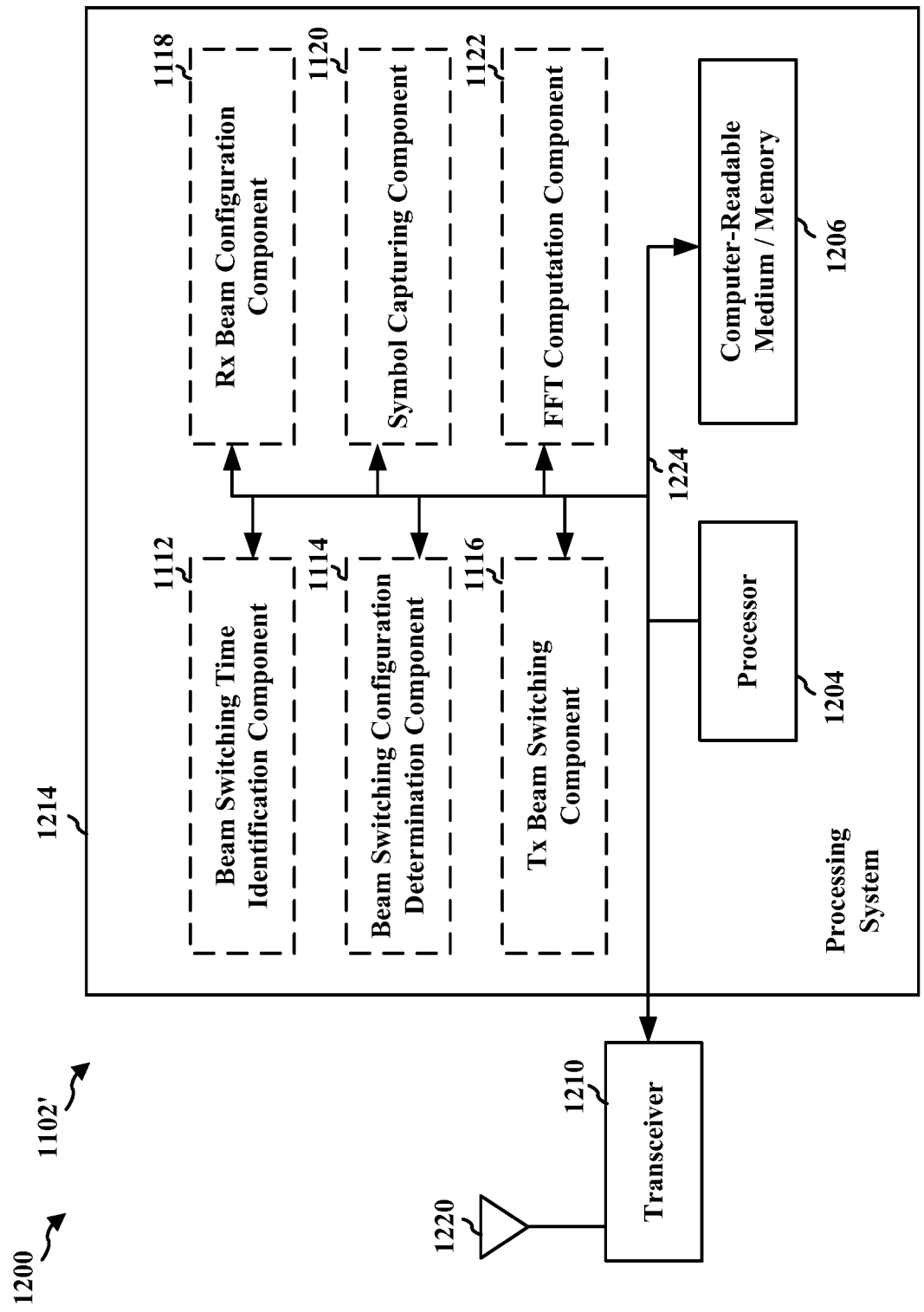
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by a processor 1204, the components 1112, 1114, 1116, 1118, 1120, 1122, and computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the symbol capturing component 1120. In addition, the transceiver 1210 receives information from the processing system 1214, specifically the Tx beam switching component 1116, and based on the received information, generates a signal to be applied to the one or more antennas 1220. The processing system 1214 includes the processor 1204 coupled to the computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1112, 1114, 1116, 1118, 1120, 1122. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. The processing system 1214 may be a component of the UE 350 and may include the memory 360 and/or at least one of the TX processor 368, the RX processor 356, and the controller/processor 359.

In one configuration, the apparatus 1102' for wireless communication includes means for identifying one or more potential time instances within the payload of a symbol to trigger a beam switch and to terminate early the payload. The apparatus 1102' includes means for determining if early termination is needed and a configuration for the beam switch. Early termination may be initiated if a low priority symbol is followed by a high priority symbol, or a symbol that has a low MCS is followed by a symbol with a high MCS. The configuration may include the switching time, a Wola window or other types of window filters that are applied to the early terminated symbol to control the ACL, the new phases of the multiple phased antennas arrays to change the direction and/or the shape of the early switched beam, etc.

The apparatus 1102' includes means for receiving the Tx symbols that include a low priority symbol and a high priority symbol for performing the early Tx beam switching of the low priority symbol using the switching configuration. The apparatus 1102' includes means for receiving the early Tx switched beam from the antenna 1220. In one aspect, if the apparatus 1102' is a base station, the apparatus 1102' includes means for receiving the early Tx switched beam based on the configuration information. The apparatus 1102' includes means for time shifting the window for the low priority symbol whose payload is terminated early to capture the signal samples of the low priority symbol payload prior to the Tx beam switching and the signal samples of a portion of the CP. The means for time shifting the window may include means for configuring the time-shifted window based on the beam switching time or the beam switching configuration information. The means for time shifting the window may include means for cyclically shifting the captured signal samples of the CP portion to the end of the captured payload signal samples. The apparatus 1102' includes means for performing the FFT on the captured and cyclically shifted signal samples of the early terminated symbol in the window to extract the data modulated on the subcarriers of the symbol.

The aforementioned means may be one or more of the aforementioned components of the apparatus 1102' and/or the processing system 1214 of the apparatus 1102' configured to perform the functions recited by the aforementioned means. As described supra, the processing system 1214 may be a component of the base station 310 and may include memory 376 and or at least one of the TX Processor 316, the RX Processor 370, and the controller/processor 375. Alternatively, the processing system 1214 may be the entire base station (e.g., see the base station 310 of FIG. 3). As such, in one configuration, the aforementioned means may be the TX Processor 316, the RX Processor 370, and the controller/processor 375 configured to perform the functions recited by the aforementioned means. As described supra, the processing system 1214 may be a component of the UE 350 and may include memory 360 and or at least one of the TX Processor 368, the RX Processor 356, and the controller/processor 359. Alternatively, the processing system 1214 may be the entire UE (e.g., see the UE 350 of FIG. 3). As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   identifying, by a device, a potential time for early beam switching within a transmission interval of a first symbol;
   determining, by the device, whether to switch a transmit (Tx) beam early based on if the first symbol is a low priority symbol and a second symbol is a high priority symbol, the second symbol following the potential time for the early beam switching;
   determining a switching configuration and a switching time based on the potential time for the early beam switching; and
   switching, by the device and within the transmission interval of the first symbol, the Tx beam early using the switching configuration and the switching time in response to determining to switch the Tx beam early.

2. The method of claim 1, wherein the high priority symbol comprises a demodulation reference signal (DM-RS) or a channel state information reference signal (CSI-RS).

3. The method of claim 1, wherein the low priority symbol comprises physical downlink control channel (PDCCH) or physical downlink shared channel (PDSCH) with a low modulation coding scheme (MCS).

4. The method of claim 1, wherein determining whether the first symbol is the low priority symbol and the second symbol is the high priority symbol is based on a predefined method.

5. The method of claim 1, wherein determining the switching configuration comprises determining a beam switching capability of a second device.

6. The method of claim 5, wherein determining the beam switching capability of the second device comprises receiving a signaling from the second device.

7. The method of claim 5, wherein determining the beam switching capability of the second device is based on a predefined method.

8. The method of claim 1, further comprising:
   transmitting the switching configuration and a trigger for the switching time to a second device.

9. The method of claim 1, wherein switching of the Tx beam early comprises switching at least one of a direction and a shape of a beam associated with a transmission configuration indicator (TCI) state.

10. The method of claim 1, wherein switching of the Tx beam early comprise switching the Tx beam before transmitting a full length payload of the first symbol.

11. The method of claim 1, further comprising:
    determining one of a transmit filter or a weighted overlapping (Wola) window to be applied to the early Tx beam to reduce a leakage of a power of the early Tx beam into one or more adjacent frequency channels.

12. The method of claim 1, wherein the determining of the switching configuration and the switching time comprise identifying the switching configuration and the switching time through a signaling received from a second device.

13. The method of claim 12, wherein the signaling comprises one of downlink control information (DCI), radio resource control (RRC) signaling, or media access control-CE (MAC-CE) signaling.

14. The method of claim 1, wherein the second symbol has a more stringent reliability requirement than the first symbol.

15. The method of claim 1, wherein the first symbol is more tolerant of error vector magnitude (EVM) loss than the second symbol.

16. The method of claim 1, wherein the first symbol is more tolerant of decoding errors than the second symbol.

17. The method of claim 1, wherein the second symbol comprises a signal used to estimate channel conditions.

18. A method of wireless communication, comprising:
determining, by a device, a switching configuration and a switching time of a received early switched beam based on if a first symbol is a low priority symbol and a second symbol is a high priority symbol, the second symbol following the early switched beam;
configuring, by the device, a receive (Rx) beam to receive the early switched beam; and
using, by the device, a time-shifted window to capture the first symbol of the early switched beam, the early switched beam occurring within a transmission interval of the first symbol and a payload of the first symbol being terminated early by the early switched beam.

19. The method of claim 18, wherein determining the switching configuration and the switching time is based on a signaling from a second device.

20. The method of claim 19, wherein the signaling comprises one of downlink control information (DCI), radio resource control (RRC) signaling, or media access control-CE (MAC-CE) signaling.

21. The method of claim 18, further comprising:
transmitting the switching configuration and the switching time to a second device.

22. The method of claim 18, further comprising:
performing a cyclic shift on a portion of the captured first symbol.

23. The method of claim 18, wherein the payload of the first symbol is prepended with a cyclic prefix (CP).

24. The method of claim 18, wherein the first symbol is an orthogonal frequency division multiplexing (OFDM) symbol.

25. The method of claim 24, further comprising performing a Fast Fourier Transform (FFT) operation on the OFDM symbol captured by the time-shifted window.

26. The method of claim 18, wherein the time-shift of the window is based on determining the switching configuration and the switching time of the early switched beam.

27. An apparatus for wireless communication, comprising:
means for identifying a potential time for early beam switching within a transmission interval of a first symbol;
means for determining whether to switch a transmit (Tx) beam early, a switching configuration, and a switching time based on the potential time for the early beam switching,
the means for determining whether to switch the Tx beam early configured to determine if the first symbol is a low priority symbol and a second symbol is a high priority symbol, the second symbol following the potential time for the early beam switching; and
means for switching, within the transmission interval of the first symbol, the Tx beam early using the switching configuration and the switching time in response to determining to switch the Tx beam early.

28. The apparatus of claim 27, wherein the means for determining the switching configuration is configured to determine a beam switching capability of a second device.

29. The apparatus of claim 27, wherein the means for switching the Tx beam early is configured to transmit the switching configuration and the switching time to a second device.

30. An apparatus for wireless communication, comprising:
means for determining a switching configuration and a switching time of a received early switched beam,
the means for determining the switching configuration and the switching time configured to determine if a first symbol is a low priority symbol and a second symbol is a high priority symbol, the second symbol following the early switched beam;
means for configuring a receive (Rx) beam to receive the early switched beam; and
means for using a time-shifted window to capture the first symbol of the early switched beam, the early switched beam occurring within a transmission interval of the first symbol and a payload of the first symbol being terminated early by the early switched beam.

31. The apparatus of claim 30, wherein the means for using the time-shifted window to capture the first symbol of the early switched beam is configured to perform a cyclic shift on a portion of the captured first symbol.

32. An apparatus for wireless communication, comprising:
a memory; and
at least one processor coupled to the memory and configured to:
identify a potential time for early beam switching within a payload of a first symbol;
determine whether to switch a transmit (Tx) beam early based on if the first symbol is a low priority symbol and a second symbol is a high priority symbol, the second symbol following the potential time for the early beam switching;
determine a switching configuration and a switching time based on the potential time for early beam switching; and
switch, within the payload of the first symbol, the Tx beam early using the switching configuration and the switching time in response to determining to switch the Tx beam early.

33. An apparatus for wireless communication, comprising:
a memory; and
at least one processor coupled to the memory and configured to:
determine a switching configuration and a switching time of a received early switched beam based on if a first symbol is a low priority symbol and a second symbol is a high priority symbol, the second symbol following the early switched beam;
configure a receive (Rx) beam to receive the early switched beam; and
use a time-shifted window to capture the first symbol of the early switched beam, the early switched beam occurring within a transmission interval of the first symbol and a payload of the first symbol being terminated early by the early switched beam.

34. A non-transitory computer-readable medium storing computer executable code, comprising code to:
identify a potential time for early beam switching within a payload of a first symbol;
determine whether to switch a transmit (Tx) beam early based on if the first symbol is a low priority symbol and a second symbol is a high priority symbol, the second symbol following the potential time for the early beam switching;

determine a switching configuration and a switching time based on the potential time for early beam switching; and switch, within the payload of the first symbol, the Tx beam early using the switching configuration and the switching time in response to determining to switch the Tx beam early.

35. A non-transitory computer-readable medium storing computer executable code, comprising code to:

determine a switching configuration and a switching time of a received early switched beam based on if a first symbol is a low priority symbol and a second symbol is a high priority symbol, the second symbol following the early switched beam;

configure a receive (Rx) beam to receive the early switched beam; and use a time-shifted window to capture the first symbol of the early switched beam, the early switched beam occurring within a transmission interval of the first symbol and a payload of the first symbol being terminated early by the early switched beam.

* * * * *